United States Patent
Takahashi

[11] 4,051,419
[45] Sept. 27, 1977

[54] CONTROL SYSTEM OF AN ALTERNATING-CURRENT MOTOR

[75] Inventor: Shuichi Takahashi, Tokyo, Japan

[73] Assignee: Honda Giken Kogyo Kabushiki Kaisha, Tokyo, Japan

[21] Appl. No.: 693,262

[22] Filed: June 4, 1976

[30] Foreign Application Priority Data

| June 9, 1975 | Japan | 50-068500 |
| June 19, 1975 | Japan | 50-073685 |
| July 16, 1975 | Japan | 50-086168 |
| Nov. 17, 1975 | Japan | 50-137291 |

[51] Int. Cl.² .............................. H02P 5/40
[52] U.S. Cl. .................. 318/227; 318/230; 318/231
[58] Field of Search ............... 318/227, 230, 231

[56] References Cited

U.S. PATENT DOCUMENTS

| 3,720,863 | 3/1973 | Ringland et al. | 318/227 |
| 3,876,918 | 4/1975 | Komuro et al. | 318/227 X |
| 3,908,130 | 9/1975 | Lafuze | 318/227 X |

Primary Examiner—Gene Z. Rubinson

[57] ABSTRACT

An alternating-current motor is used as an actuator of a positioning control system. The control variable to control the torque of the motor is the load angle $\theta_d$ of a synchronous motor or the slip frequency $f_s$ of an induction motor.

The highest and the lowest limit values of the control variable are respectively predetermined from the characteristics between the torque and the control variable and from other design considerations.

The preparatory value E for the control variable is synthesized in accordance with an equation $E = G_1(\theta_c - \theta_a) - G_2 p \theta_a$, where $\theta_c$ is the reference position, $\theta_a$ is the controlled position, $G_1$ and $G_2$ are respectively amplification constants, and $p$ denotes the differential operator $d/dt$. When E is within the predetermined highest and the lowest limit values of the control variable, E is used as the control variable; when E is larger than the predetermined highest limit value, the highest limit value is used as the control variable; and when E is smaller than the predetermined lowest limit value, the lowest limit value is used as the control variable.

After the control variable is thus determined, the instantaneous phase angle signal is synthesized in accordance with an equation $\theta_p = \theta_a + \theta_d$ or $\theta_p = \theta_a + 2\pi f_s / p$ where the instantaneous electrical angular position of the rotor of the motor is also denoted by $\theta_a$.

The instantaneous phase angle of the power supply to the motor is controlled with this synthesized $\theta_p$ as the reference signal.

The voltage amplitude $V_1$ of the power supply is controlled as a constrained variable to control the torque of the motor. The reference signal of the voltage amplitude $V_1$ is determined as a function of the frequency of the power supply, or in one embodiment for a synchronous motor, as a function of the frequency and the load angle.

23 Claims, 12 Drawing Figures

FIG.2
(a) 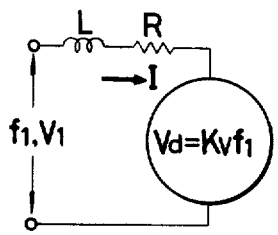
(b) 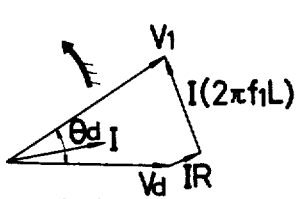
(c) 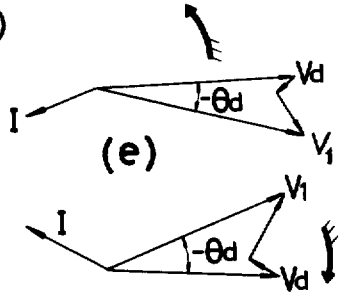
(d) 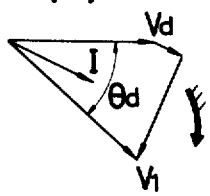
(e)
FIG.3
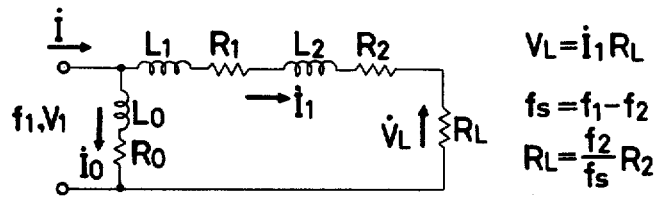
$V_L = i_1 R_L$
$f_s = f_1 - f_2$
$R_L = \frac{f_2}{f_s} R_2$

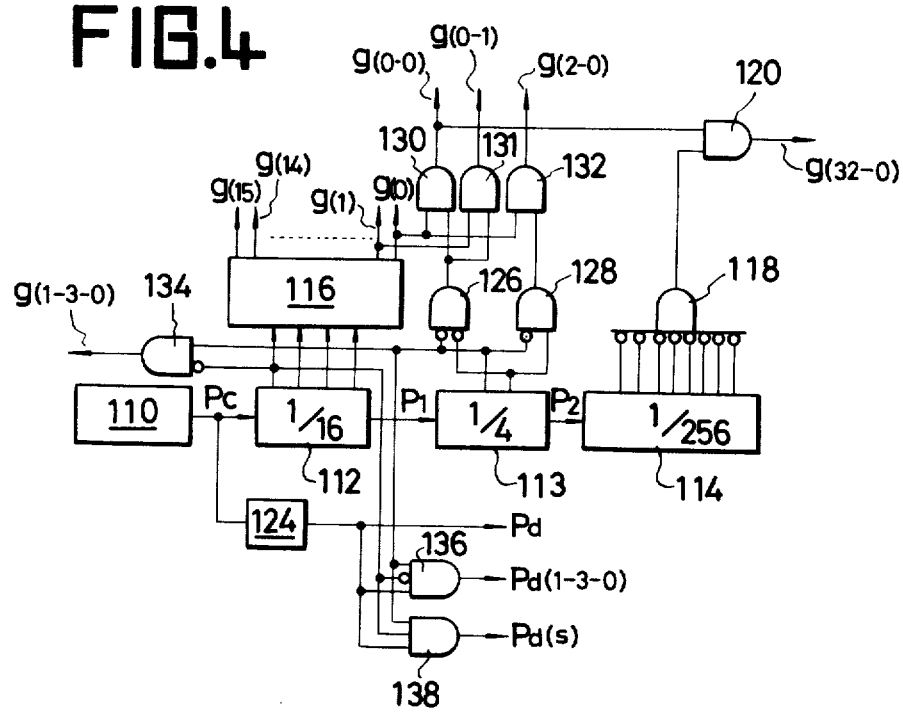
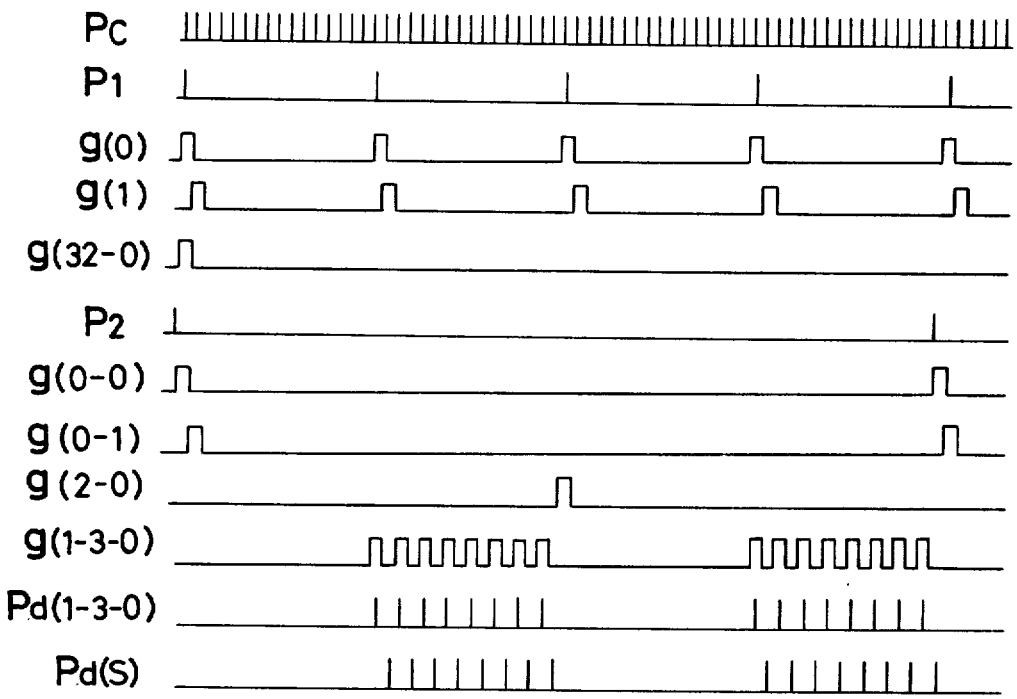
FIG.4

FIG.8
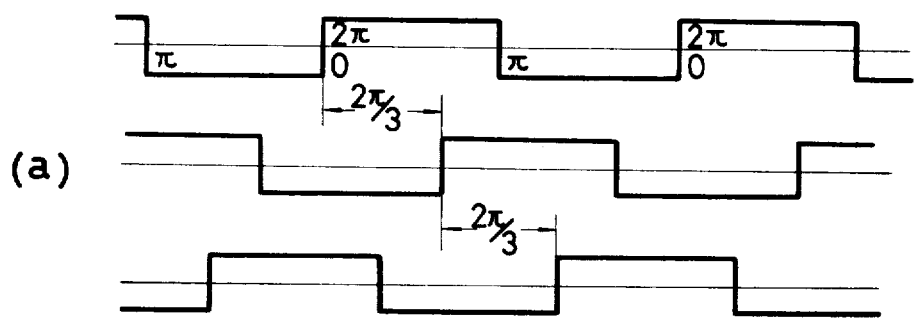
(a)
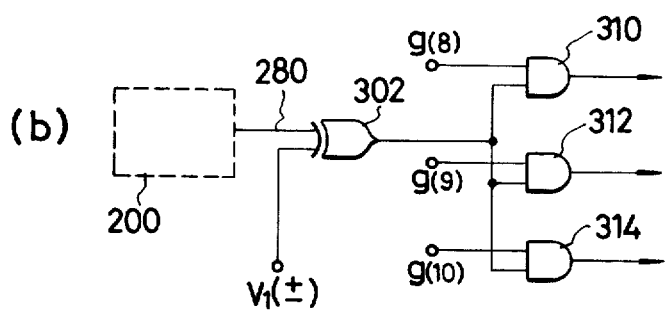
(b)
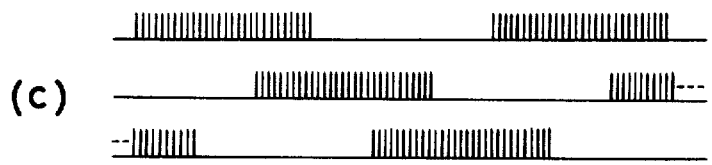
(c)

CONTROL SYSTEM OF AN ALTERNATING-CURRENT MOTOR

BACKGROUND OF THE INVENTION

This invention relates to a control system of an alternating-current motor, and more particularly to a positioning control system in which an alternating-current motor is the actuator.

Speed control systems of an alternating-current motor in which the frequency of the motor power supply is controlled, have been, heretofore well known. For example, the heretofore known variable frequency induction motor drive systems are summarized in a paper by Jalat T. Salihi on "Simulation of controlled-slip variable-speed induction motor drive systems" in IEEE transactions in industry and general applications, Vol. IGA-5, No. 2, March/April 1969. And heretofore known variable frequency synchronous motor drive systems are described in a paper by Armando Bellini, Alessandro De Carli, and Mario Murgo on "Speed control of synchronous machines" in IEEE transactions on industry and general applications, Vol. IGA-7, No. 3, May/June 1971.

In all these prior disclosures, there is not a description of an automatic control system of an alternating-current motor. In an automatic control system of an alternating-current motor, there must be provided a control variable limiting means which receives the initial value for the control variable as synthesized from the reference signal and the controlled variable, and which automatically limits the variable range of the control variable within a range adapted for the control purpose.

In all heretofore known variable frequency alternating-current motor drive systems, this control variable limiting means which automatically limits the control variable within a range adapted for the control purpose has not been found.

In U.S. patent application Ser. No. 543,026, now U.S. Pat. No. 4,009,427, entitled "Adaptive control system for an alternating-current motor" which was filed on Jan. 22, 1975 by the inventor of the present invention and which will hereafter be referred to as the inventor's prior patent application, an alternating-current motor drive system which is adapted use in a positioning control system is disclosed.

In this control system disclosed by the inventor's prior patent application, the control variable is the slip frequency $f_s$ for an induction motor or the load angle $\theta_d$ (other names for the load angle are displacement angle, torque angle, coupling angle, internal angle; the term of load angle will hereafter be used) for a synchronous motor. The maximum magnitude $\theta_k$ of the load angle $\theta_d$ or the maximum magnitude $f_k$ of the slip frequency $f_s$ is predetermined, and a limiting means automatically limits the magnitude of $\theta_d$ within the value of $\theta_k$, or the magnitude of $f_s$ within the value of $f_k$.

In the inventor's prior patent application, it is disclosed that the magnitude $f_T$ of the slip frequency at which the maximum magnitude of the torque is developed in an induction motor or the magnitude $\theta_T$ of the load angle $\theta_d$ at which the maximum magnitude of the torque is developed in a synchronous motor is approximated by a constant which is determined by the machine parameters. $f_k$ or $\theta_k$ is predetermined in a range where $f_k \leq f_T$ or $\theta_k \leq \theta_T$.

In the control system disclosed by the inventor's prior patent application, the control variable is generated in direct proportion to the position error in a range where the magnitude of the control variable is not larger than $f_k$ or $\theta_k$. In a range where the magnitude of the position error is large and the magnitude of the initial value for the control variable as determined by the position error exceeds the predetermined limit, the predetermined limit $f_k$ or $\theta_k$ is used as the magnitude of the control variable. The direction of the control variable is determined by the direction of the position error.

Thus, by the disclosure of the inventor's prior patent application, the problem of the automatic control system of an alternating-current motor is solved. But, in practical applications, there are some disadvantages to be further improved in the control system of the inventor's prior patent application.

One of the disadvantages is that the system of the inventor's prior patent application is based on a principle of velocity-detection and frequency-synthesis. The measurement of a velocity naturally takes a finite time and the time lag caused by this finite time is not desirable in some applications, especially in a control of a synchronous motor.

Other disadvantages come from performance characteristics of the inverter included in the control system. The control variable of the inventor's prior patent application can be either positive or negative in the limited range of the magnitude, generating either a positive (an accelerating) torque or a negative (braking) torque. For a negative value of the torque to be generated, an electric current will flow from the motor to the inverter when the velocity of the motor is not sufficiently small. Some of the conventional type static inverters do not absorb the power generated by the motor. Therefore, when the control variable is negative in a range where the motor velocity is not sufficiently small, this negative power input to the motor (negative power output from the inverter) must be properly controlled.

Although a unity power-factor is desirable for some type of static inverters, the power factor of a synchronous motor is improved only by the control of the field exciting current in the control system of the inventor's prior patent application. The power factor improvement obtained by controlling the amplitude $V_1$ of the armature input voltage of a synchronous motor is more advantageous.

In one embodiment of the inventor's prior patent application, the frequency $f_1$ of the power supply voltage is controlled in direct proportion to the position error in accordance with an equation $f_1 = G_1(\theta_c - \theta_a)$ where $\theta_c$ is the reference position, $\theta_a$ is the controlled position, and $G_1$ is an amplification factor. Since the slip frequency $f_s$ is $f_s = f_1 - f_2$, where $f_2$ is the motor velocity in electrical revolutions per second, the foregoing equation is equivalent to an equation $f_s = G_1(\theta_c - \theta_a) - f_2$, which means that a speed feedback term $f_2$ is introduced in the control variable $f_s$ which is nearly proportional to the torque T generated. This introduction of a speed feedback term is advantageous to stabilize the performance of the positioning control system.

But the disadvantage of this method for introducing the speed feedback term is that the coefficient of the speed feedback term is not adjustable.

In a velocity control of an induction motor according to claim 20 of the inventor's prior patent application, a generator means for generating a frequency corresponding to the reference velocity is included in the means for detecting the position error. This frequency generator means will be expensive when an adjustable reference velocity is required. This is one of the disadvantages to be improved in the control system of the inventor's prior patent application.

BRIEF SUMMARY OF INVENTION

Accordingly it is the general object of the present invention to provide an improved system for a positioning control of an alternating-current motor, in which the disadvantages in the control system of the inventor's prior patent application are eliminated.

More particularly, an object of this invention is to provide a positioning control system of an alternating-current motor in which the torque of the motor is controlled by controlling the instantaneous phase angle of the motor power supply at a sufficiently high information rate.

Another object of this invention is to provide a positioning control system in which the coefficient of the speed feedback term is adjustable.

Another object of the present invention is to provide a positioning control system in which the torque of an alternating-current motor is controlled within the range where the requirement to the inverter is in the allowable performance range of the inverter.

A further object of this invention is to provide a positioning control system in which the torque of a synchronous motor is controlled while unity power-factor of the motor input is maintained without any adjustment on the exciting current of the magnetic poles of the motor.

Still another object of this invention is to provide a velocity control system of an electric motor in which an adjustable velocity of high precision is obtained by a fixed single frequency clock oscillator.

For a better understanding of the invention, its operating advantages, and specific objects attained by its use, reference should be had to the accompanying drawings and descriptive matter in which there are illustrated and described several preferred embodiments of this invention.

DESCRIPTION OF THE DRAWINGS

In the drawings:

FIG. 2 shows a simplified equivalent circuit diagram and the vector diagrams for a synchronous motor;

FIG. 3 shows a simplified equivalent circuit diagram of an induction motor;

FIG. 4 is a schematic block diagram of an embodiment of the timing-pulse generator means which is used in the phase signal generator means of this invention;

FIG. 8 shows a circuit diagram and waveform diagrams of an embodiment of the interface means to a phase angle control means of this invention;

DETAILED DESCRIPTION OF THE INVENTION

Figure 1:
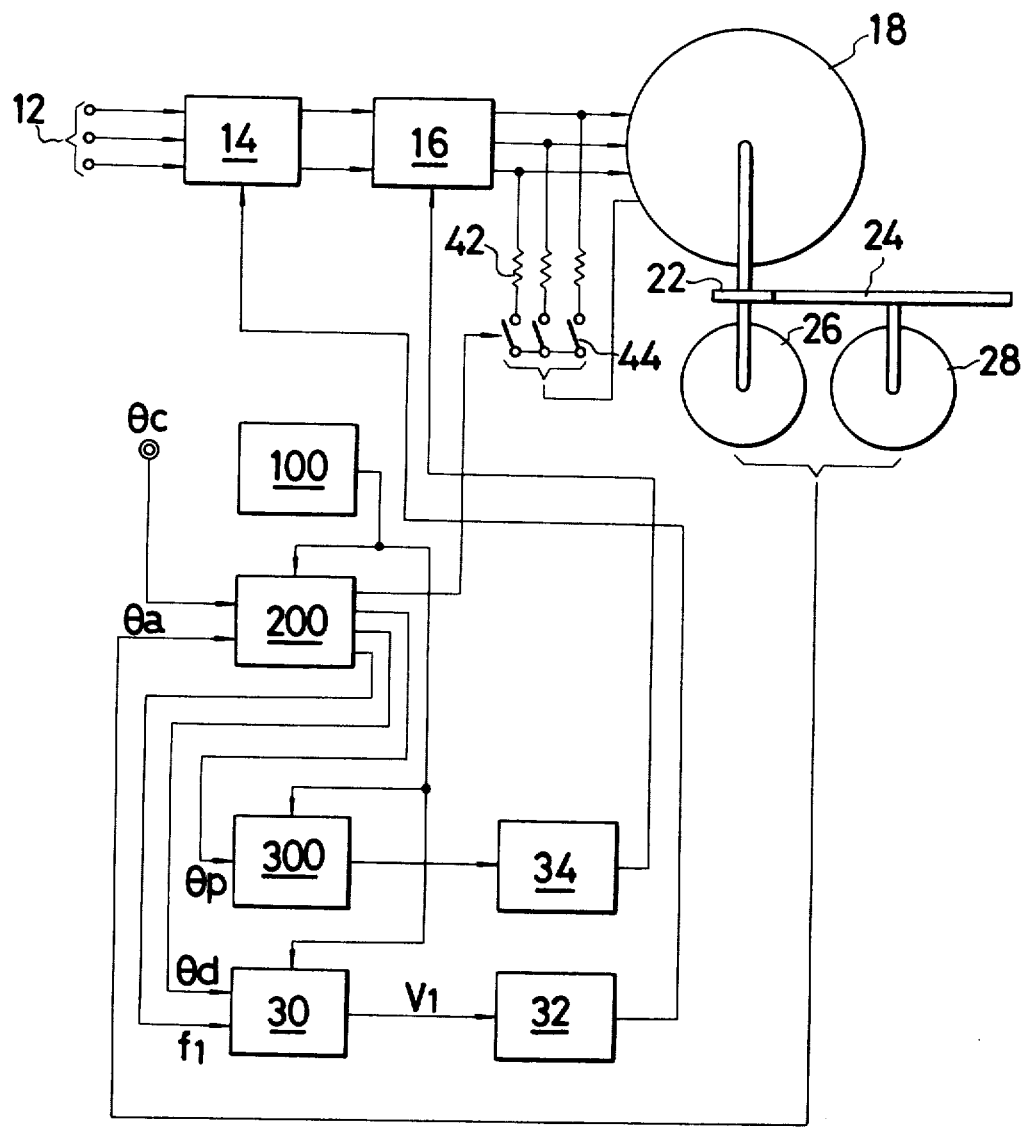
FIG. 1 illustrates a schematic block diagram of an embodiment of this invention.

Referring now to the drawings, wherein like reference numerals designate like or corresponding parts throughout the drawings, FIG. 1 illustrates a schematic block diagram of an embodiment of the present invention.

A three-phase alternating-current power from a commercial power supply is supplied through terminals 12 to a rectifier 14 of a controllable output voltage. The rectified direct-current power of a controllable voltage from the rectifier 14 is supplied to a three-phase inverter 16 of a controllable instantaneous output phase angle. The amplitude of the supply voltage from the inverter 16 is controlled by controlling the rectifier 14 through a voltage control means 32, and the instantaneous phase angle of this supply voltage is controlled by a phase angle control means 34.

Thus, a three-phase alternating-current power of a controllable amplitude and a controllable instantaneous phase angle is supplied to a three-phase alternating-current motor 18 from the inverter 16.

The load, or the position-controlled object of this control system, which is connected to the motor rotation, and the gear train between the load and the motor shaft are not shown in the drawing.

The instantaneous angular position of the motor shaft is detected by a position detector means 26, 28. A gear train 22, 24 connects the position detector means 26, 28 to the motor shaft. Although any conventional type of position detector means may be used for this purpose, it will be assumed in the following descriptions that the output signal of the position detector means 26, 28 is the instantaneous rotor angular position $\theta_a$ (electrical radians with respect to a stator reference) in a form of a digital code.

In order to simplify the notations, the instantaneous position of the controlled object will be represented as normalized to the instantaneous rotor angular position, or in other words, the gear ratio between the motor shaft and the controlled object is normalized as unity. Thus, the position of the controlled object is also represented by $\theta_a$. Therefore, $\theta_a$ in general is a mixed decimal when $2\pi$ radians is counted as unity, and the fractional part of this mixed decimal represents the instantaneous rotor position.

Reference numeral 200 indicates a phase signal generator means for synthesizing the instantaneous phase angle signal $\theta_p$ which is used as the reference signal to control the instantaneous phase angle of the alternating-current voltage of the output of the inverter 16.

In the embodiment illustrated in FIG. 1, it will be assumed that all the input and the output signals of the phase signal generator means 200 are in the form of a digital code and therefore the phase signal generator means 200 is a digital data processor.

The one input signal to the phase signal generator means 200 is the reference position $\theta_c$ of the controlled object and the other input signal is $\theta_a$ from the position detector means 26, 28 which indicates the position of the controlled object as well as the instantaneous rotor angular position.

The output signals from the phase signal generator means 200 are the instantaneous phase angle signal $\theta_p$ which is transmitted to an interface means 300, the frequency signal $f_1$ which is transmitted to a voltage signal generator means 30, and in a preferred embodiment for a synchronous motor, the load angle signal $\theta_d$ which is also transmitted to the voltage signal generator means 30.

In one embodiment which will be explained in the later paragraphs, the phase signal generator means 200 also generates a logic signal to actuate a switching means 44 for connecting a power absorbing means 42 in parallel to the motor windings.

The voltage signal generator means 30 receives the frequency signal $f_1$ or in one embodiment for a synchronous motor control the frequency signal $f_1$ and the load angle signal $\theta_d$, and generates the voltage signal $V_1$.

The voltage control means 32 receives this voltage signal $V_1$ from the voltage signal generator means 30 and controls the amplitude of the output voltage of the inverter 16 with this voltage signal $V_1$ as the reference signal. This voltage control may be either open-looped or closed-looped, and in the closed-loop, the inverter 16 may or may not be included.

The interface means 300 modifies, when necessary, the instantaneous phase angle signal $\theta_p$ to a form which is adapted for the input signal of the phase control means 34.

Reference numeral 100 indicates a timing-pulse generator for supplying the timing-pulse necessary in the digital data processing to the phase signal generator means 200, the interface means 300, and the voltage signal generator means 30.

Since the rectifier 14, the inverter 16, the voltage control means 32, and the phase control means 34 are well known in this technological field, and since any conventional system of generating a controllable amplitude and controllable instantaneous phase angle polyphase alternating-current power may be used in the control system of this invention, no further explanation on these components will be necessary.

Before coming to detailed descriptions on other components, some elementary performance formulas for a variable frequency alternating-current motor will be deduced.

Referring to FIG. 2, there are shown a simplified equivalent circuit diagram and the vector diagrams of a synchronous motor. In this simplified circuit as shown in FIG. 2(a), the effect of the armature reaction on a salient-pole machine is neglected, and the effect of the armature current on the flux component is included in the synchronous reactance as represented by L in the drawing.

The control system for a fixed frequency synchronous motor in which the field exciting current is controlled, has heretofore been well known and it will not be difficult to combine this heretofore known exiciting current control system with the system of this invention for a person skilled in the art of this field after the descriptions of this invention have been understood.

Therefore, in order to simplify the descriptions, the magnetomotive-force of the rotating poles of a synchronous motor is assumed to be constant in the embodiments as will be described in the following paragraphs.

And throughout the following descriptions, the wave-form of all the voltages and currents are assumed to be sinusoidal unless otherwise stated, and the amplitude of the sinusoidal waveform is represented by its effective value.

Referring to the simplified circuit of FIG. 2(a), the voltage $V_d$ generated by the flux of the magnetic poles may be expressed by $$V_d = k_V f_2 \tag{1}$$

where $f_2$ denotes the velocity of the motor and $k_V$ is a constant since the magnetomotive-force of the rotating poles is assumed to be a constant. Substituting this constant $k_V$ by another constant $I_m$ which is related with $k_V$ by an equation $$k_V = 2\pi L I_m \tag{2}$$

where $$X = 2\pi f_1 L \tag{3}$$

is the synchronous reactance of the motor and $f_1$ is the frequency of the power supply voltage.

From equations (1), (2), (3), we obtain $$V_d = X I_m \tag{4-1}$$

since $f_2 = f_1$ for a synchronous motor when the velocity $f_2$ is measured by the revolutions of the electrical angle.

When the vectors of the input voltage $\dot{V}_1$ and the input current $\dot{I}$ are represented on a complex number plane in which the positive real axis coincides with the direction of the vector $\dot{V}_d$ and the direction of the imaginary axis is determined in accordance with the direction of the motor rotation, $$\dot{V}_1 = V_1(\cos\theta_d + j\sin\theta_d)$$

(5), for all the vector relations as illustrated in FIG. 2(b), FIG. 2(c), FIG. 2(d), and FIG. 2(e).

In equation (5), $V_1$ is the amplitude of the input voltage and $\theta_d$ is the phase difference between vector $\dot{V}_1$ and vector $\dot{V}_d$ and will be called a load angle throughout the following descriptions.

$$\dot{I} = \frac{\dot{V}_1 - \dot{V}_d}{R + jX} = \frac{1}{Z^2}\{R(V_1\cos\theta_d - V_d) + XV_1\sin\theta_d\} \\ - j\frac{1}{Z^2}\{X(V_1\cos\theta_d - V_d) - RV_1\sin\theta_d\} \tag{6}$$

where R is the resistance of the armature winding and $Z^2 = R^2 + X^2$.

The input power $\dot{P}$ to the motor is $$\dot{P} = \dot{V}_1 \bar{I} = \frac{V_1}{Z^2}\left[\left(RV_1 - (R\cos\theta_d - X\sin\theta_d)V_d\right) - j\left(XV_1 - (R\sin\theta_d + X\cos\theta_d)V_d\right)\right] \tag{7-1}$$

The power-factor will be unity (the imaginary part of P will become zero) when $$f_o = \frac{R}{2\pi L}.$$

and from equations (4-1) and (8), we obtain $$V_1 = 2\pi L I_m(f_1 \cos\theta_d + f_o \sin\theta_d) \tag{9-1}$$

where $f_o = R/2\pi L$.

From equations (6) and (9-1), we obtain $$\dot{I} = I_m(\cos\theta_d + j\sin\theta_d)\sin\theta_d \tag{10-1}$$

and the torque generated in the motor will be $$T = \frac{K_T V_d I_m \cos\theta_d \sin\theta_d}{f_2} = \frac{K_T}{2}(2\pi L)I_m^2 \sin 2\theta_d \tag{11-1}$$

where $K_T$ is a constant.

Thus, the torque generated becomes a function of a single variable $\theta_d$, when the amplitude $V_1$ of the supply voltage is controlled in accordance with equation (9-1); and in a region where the magnitude of $\theta_d$ is comparatively small, the torque T is nearly proportional to $\theta_d$, and will be expressed by an equation $$T = k_d \theta_d \tag{12-1}$$

where
$$k_d = K_T(2\pi L I_m^2).$$

It is also obvious from equation (11-1) that $(dT/d\theta_d)$ is positive or zero in the range where $(-\pi/4) \leq \theta_d \leq (\pi/4)$. Therefore, it is desirable to limit the value of $\theta_d$ in this range.

It must be noted, however, that the voltage amplitude $V_1$ may be controlled in accordance with any voltage control law which is adapted for the control purpose. For example, the voltage amplitude $V_1$ may be controlled as a function of a single variable $f_1$ in accordance with an equation $V_1 = ZI_m$ or $V_1 = XI_m$. The torque equation will be different and the range where $(dT/d\theta_d) \geq 0$ will be different for different voltage control law. But it will be easily demonstrated that the torque is nearly proportional to $\theta_d$ under any voltage control law in a region where the magnitude of $\theta_d$ is comparatively small.

From equations (5), (9-1), and (10-1), it will be obvious that, when the magnitude of $\theta_d$ is less than $\pi/2$, $\dot{V}_1$ and $\dot{I}$ are in the same phase when $\theta_d \geq 0$, and that $\dot{V}_1$ and $\dot{I}$ are in the mutually opposite phase when ($\theta_d < 0$ and $V_1 > 0$).

It must be noted that, when $\dot{V}_1$ and $\dot{I}$ are in the mutually opposite phase, an electric power flows from the motor 18 to the inverter 16 and the synchronous motor becomes a synchronous generator.

Referring next to FIG. 3, there is shown a simplified equivalent circuit diagram of an induction motor. In the drawing, $\dot{I}$ represents the total input current, and $\dot{I}_o$, $R_o$, $L_o$ are respectively the no-load current, the no-load equivalent resistance, and the no-load input inductance. The current $\dot{I}_1$ is defined as $\dot{I}_1 = \dot{I} - \dot{I}_o$. $L_1$ and $R_1$ are respectively the inductance and the resistance of the primary winding. $L_2$ and $R_2$ are respectively the inductance and the resistance of the secondary winding, the values being in primary terms. $\dot{V}_L$ is the voltage induced in the secondary winding (the value being in the primary term), and $\dot{V}_L = \dot{I}_1 R_L$ where $$R_L = \frac{f_2 R_2}{f_s}.$$

The notation $f_s$ is the slip frequency and is equal to $f_s = f_1 - f_2$ where $f_1$ is the frequency of the power supply voltage and $f_2$ is the velocity of the motor as measured by the revolutions of the electrical angle.

From the simplified equivalent circuit diagram of FIG. 3, $$\dot{i}_1 = \frac{V_1}{(2\pi f_1)(L_1 + L_2)\left(\frac{f_{o1}}{f_1} + \frac{f_{o2}}{f_s} + j\right)} \tag{10-2}$$

and $$V_1 = I_o(R_o + j2\pi f_1 L_o) \tag{4-2}$$

where $$f_{o1} = \frac{R_1}{2\pi(L_1 + L_2)}, \text{ and } f_{o2} = \frac{R_2}{2\pi(L_1 + L_2)}$$

The torque T generated in the motor is, $$T = \frac{K_T I_1^2 R_L}{f_2} = K_T V_1^2 \frac{f_{o2} f_s}{2\pi(L_1 + L_2)\{(f_{o1} f_s + f_{o2} f_1)^2 + f_1^2 f_s^2\}} \tag{13}$$

The voltage amplitude $V_1$ of an induction motor may be determined by
$$V_1 = I_{om}\sqrt{R_o^2 + (2\pi f_1 L_o)^2} \tag{14}$$

as described in the specification of the inventor's prior patent application, where the constant $I_{om}$ is the allowable no-load current of the induction motor. In some applications, equation (14) may be further simplified as $$V_1 = 2\pi L_o I_{om} f_1 \tag{9-2}.$$

When the amplitude $V_1$ of the input voltage to an induction motor is controlled in accordance with equation (9-2), we obtain from equation (13), $$T = K_T I_{om}^2 \frac{2\pi L_o^2}{(L_1 + L_2)} \cdot \frac{f_{o2} f_s}{(f_{o1} f_s/f_1 + f_{o2})^2 + f_s^2} \tag{11-2}$$

The power factor $\cos\phi$ between $\dot{V}_1$ and $\dot{I}_1$ is obtained from equation (10-2) as $$\cos\phi = \frac{f_{o1} f_s + f_{o2} f_1}{\{(f_{o1} f_s + f_{o2} f_1)^2 + f_1^2 f_s^2\}^{\frac{1}{2}}}$$

and when $f_{o1} f_s$ is sufficiently smaller than $f_{o2} f_1$, $$\cos\phi = \frac{f_{o2}}{(f_{o2}^2 + f_s^2)^{\frac{1}{2}}} \tag{7-2}$$

It will be obvious from equation (11-2) that the torque T is nearly proportional to $f_s$ in a region where the magnitude of $f_s$ is comparatively small, and will be expressed by an equation $T = k_s f_s$ (12-2)

where
$$k_s = K_T I_{om}^2 (2\pi L_a)^2 / R_2.$$

It is also derived from equation (11-2) that the range in which $(dT/df_s) \geq 0$ is the range $(-f_T) \leq f_s \leq (f_T)$ where $$f_T = \frac{f_{o2} f_1}{(f_{o1}^2 + f_1^2)^{\frac{1}{2}}} \quad (15).$$

Therefore it is desirable to limit the value of $f_s$ within this range. Although $f_T$ is not a constant, $f_T$ may be approximated by $f_{o2}$ in an region where $f_1$ is sufficiently larger than $f_{o1}$.

As will be understood from equation (7-2), the input power factor of an induction motor is a function of the slip frequency $f_s$, and therefore, the input power factor may impose a limitation on the variable range of the slip frequency $f_s$ when a low power factor output is to be avoided for the inverter.

Also it will be easily demonstrated from equation (10-2) that an electric power flows from the motor to the inverter for a negative value of $f_s$ in a range where $f_1$ is not sufficiently small.

With these elementary performance formulas as described in connection with FIG. 2 and FIG. 3 in mind, the data processing in the phase signal generator means will be explained.

In the first step, the initial value E for the control variable is synthesized in accordance with an equation $$E = G_1(\theta_c - \theta_a) - G_2 f_2 \quad (16),$$

by a means for synthesizing a initial value for the control variable, which is included in the phase signal generator means 200. $G_1$ and $G_2$ in equation (16) are the amplification constants. $G_2 f_2$ means the speed feedback term of the positioning control system and may be adjusted to a magnitude suitable for the control purpose. In some applications $G_2$ may be zero.

In the embodiment of FIG. 1, the instantaneous motor velocity $f_2$ is obtained by differentiating the value of $\theta_a$, that is, in accordance with an equation $$f_2 p \frac{\theta_a}{2\pi} \quad (17).$$

The initial value E for the control variable is then processed through a control variable limiting means which is a part of the phase signal generator means 200.

In the present invention, the load angle $\theta_d$ of a synchronous motor or the slip frequency $f_s$ of an induction motor is selected as the control variable, and the output signal from the control variable limiting means will be as shown in Table 1:

(Table 1)

| Region | Criterion | Output Signal (Control Variable) |
|---|---|---|
| 1 | $E > \theta_{k1}$ or $E > f_{k1}$ | $\theta_d = \theta_{k1}$ or $f_s = f_{k1}$ |
| 2 | $\theta_{k2} \leq E \leq \theta_{k1}$ or $f_{k2} \leq E \leq f_{k1}$ | $\theta_d = E = G_1(\theta_c - \theta_a) - G_2 f_2$ or $f_s = E = G_1(\theta_c - \theta_a) - G_2 f_2$ |
| 3 | $\theta_{k2} > E$ or $f_{k2} > E$ | $\theta_d = \theta_{k2}$ or $f_s = f_{k2}$ |

In Table 1, $\theta_{k1}$ or $f_{k1}$ denotes the highest limit value of the control variable and $\theta_{k2}$ or $f_{k2}$ denotes the lowest limit value of the control variable. The highest and the lowest limit values of the control variable are determined from various design requirements.

The inherent limitation for the control variable is the limitation within the range where $dT/d\theta_d$ or $dT/df_s$ is not negative. The highest and the lowest values of the control variable are to be determined preferably within this inherent limit leaving a necessary margin against the external disturbances.

One limitation may come from the maximum current allowable for the input of the motor or allowable for the output of the inverter. For example, when the magnitude of the input current to the synchronous motor, which is controlled by a voltage control law of equation (9-1), is to be limited within $I_m/2$ (refer to equation (10-1)), the magnitude of the $\theta_d$ must be limited within $\pi/6$, although the inherent limit for $\theta_d$ is $\pi/4$ from equation (11-1).

Other limitations may come from the type of the inverter employed. When a low power factor is to be avoided for the inverter, the slip frequency $f_s$ of an induction motor must be further limited by the power-factor limit. (refer to equation (7-2)). When the inverter can not absorb the power generated by the motor, a power absorbing means 42 must be connected in parallel with the motor, or in one alternative, the control variable must be limited to avoid the power flow reversal.

Taking all these considerations into account, the highest limit value $\theta_{k1}$ or $f_{k1}$ and the lowest limit value $\theta_{k2}$ or $f_{k2}$ are predetermined and are preset in the means for limiting the control variable in this invention.

The highest limit value $\theta_{k1}$ or $f_{k1}$ is usually a constant, and the lowest limit value $\theta_{k2}$ or $f_{k2}$ may either be a constant or may be expressed as a function or $f_1$ or $f_2$.

In the phase signal generator means 200 for an induction motor, is included an integrator which integrates the slip frequency $f_s$ to produce the slip phase angle $\theta_s$ in a relation $$\theta_s = \frac{2\pi f_s}{p} \quad (18).$$

After the load angle $\theta_d$ or the slip phase angle $\theta_s$ is thus determined, the instantaneous phase angle signal $\theta_p$ is synthesized in accordance with an equation $$\theta_p = \theta \text{hd } a + \theta_d \quad (19\text{-}1)$$

or $$\theta_p = \theta_a + \theta_s \quad (19\text{-}2).$$

In equation (19-1) the value of $\theta_a$ must be measured with respect to such a reference point as to indicate the instantaneous phase angle of the vector $V_d$. And in equation (19-2) the reference point for $\theta_a$ may be determined at random since only the rate of change is a matter of concern for an induction motor. Therefore, the position detector means 26 for the instantaneous rotor angular position of an induction motor can be simpler than that of a synchronous motor.

The frequency signal $f_1$ for a synchronous motor is the value $f_2$ in equation (17) since $f_1 = f_2$ in a synchronous motor. The frequency signal for an induction motor is synthesized in the phase signal generator means 200 in accordance with an equation $$f_1 = f_2 + f_s \quad (20).$$

In one embodiment of this invention, the frequency signal i f₁ is integrated in the phase signal generator means 200 to produce the instantaneous phase angle signal $\theta_p$ as $$\theta_p = \frac{2\pi f_1}{p} \tag{19-3}$$

In the embodiment of this invention as shown in FIG. 1, the amplitude $V_1$ of the power supply voltage is controlled as a constrained variable. There may be a variety of control laws for determining the value of $V_1$, and in one embodiment as shown in FIG. 1, it will be assumed that the voltage signal $V_1$ is synthesized in the voltage signal generator means 30 in accordance with equation (9-1) or (9-2).

Thus, when the initial value E for the control variable is in the Region 1 or Region 3 of Table 1, a torque will be generated in the motor in the direction as to reduce the magnitude of E, and the value of E will come in region 2 of Table 1.

In region 2 of Table 1, the generated torque T will be nearly proportional to the control variable and will be balanced as indicated by an equation $$k_s\{G_1(\theta_c-\theta_a)-G_2 f_2\}=(Jp+F)f_2 \tag{21-1}$$

or $$k_t\{G_1(\theta_c-\theta_a)-G_2 f_2\}=(Jp+F)f_2 \tag{21-2}$$

where J denotes the total moment of inertia around the motor shaft and F denotes the coefficient of the total equivalent friction exerted on the motor shaft.

From equation (21-1) or (21-2), the transfer function of the positioning control system of this invention will be easily deduced.

Before coming to FIG. 4, assumptions are made on the type of the digital code employed and on the type of the device used in order to simplify the following descriptions, although any digital code and any device can be used in the control system of this invention.

It will be assumed that a pure binary code is used throughout the data processing system. A negative number in a register is expressed by the complement to $2^n$ and by a sign digit at the place for the $2^n$ digit where the most significant digit of the register represents $2^{n-1}$. A subtraction is performed in a digital adder by the addition of the complement. It will also be assumed that the adders and registers are all of the digit-parallel type.

In order to simplify the drawings for easy understanding, a simplified representation is used throughout the drawings. For example, in the drawings, only one terminal will be shown of the necessary plural number of parallel terminals corresponding to the number of the necessary parallel digits, and the clock-pulse circuits of the adders and registers will not be shown.

Since digital adders and digital registers are well known in this technological field, it will be easy for a person skilled in the art of this field to interpret these simplified drawings, and it will not be difficult for a person skilled in the art of this field to use another type of code and another type of device for the same purpose.

Now, referring to FIG. 4, there is shown a schematic block diagram of an embodiment of the timing pulse generator 100 and the performance time chart.

A master oscillator 110 generates a pulse $P_c$ of a frequency, for example, of 524,288 Hz, and this $P_c$ pulse is delayed by a suitable amount of delay through a delay element 124, and a delayed pulse $P_d$ is obtained. The pulse $P_d$ is used for the clock pulse.

A pulse counter 112 divides the frequency of $P_c$ pulse by 16 and generates $P_1$ pulse. A pulse counter 113 divides the frequency of $P_1$ pulse by 4 and generates $P_2$ pulse. A pulse counter 114 divides the frequency of $P_2$ pulse by 256.

The count-phases of the counter 112 are selected through a decoder 116, and gate pulses are generated as shown by $g(0)$-$g(15)$ in the drawing. (The gate pulses $g(2)$-$g(15)$ are not shown in the time chart.) The number 0 count-phase and the number 2 count-phase of the counter 113 are selected by gates 126 and 128 respectively, and a gate pulse $g(0\text{-}0)$ and a gate pulse $g(2\text{-}0)$ are generated from gates 130 and 132 respectively. The number 1 count-phase of the counter 116 is selected by a gate 131 and a gate pulse $g(0\text{-}1)$ is generated.

The even-numbered phases of the counter 112 included in the odd-numbered phases of the counter 113 are selected by a gate 134, and a gate pulse $g(1\text{-}3\text{-}0)$ is generated as shown in the time chart. The $P_d$ pulse included in the even-numbered phases of the counter 112 in the odd-numbered phases of the counter 113 is selected by a gate 136 and a clock pulse $P_c(1\text{-}3\text{-}0)$ is generated, while the $P_d$ pulse in the odd-numbered phases of the counter 112 in the odd-numbered phases of the counter 113 is selected by a gate 138 and a shift-pulse $P_c(S)$ is generated.

The number 0 phase of the counter 114 is selected by a gate 118, and a gate pulse $g(0\text{-}0)$ in the number 0 phase of the counter 114 is selected by a gate 120, and a gate pulse $g(32\text{-}0)$ is obtained.

Figure 5:
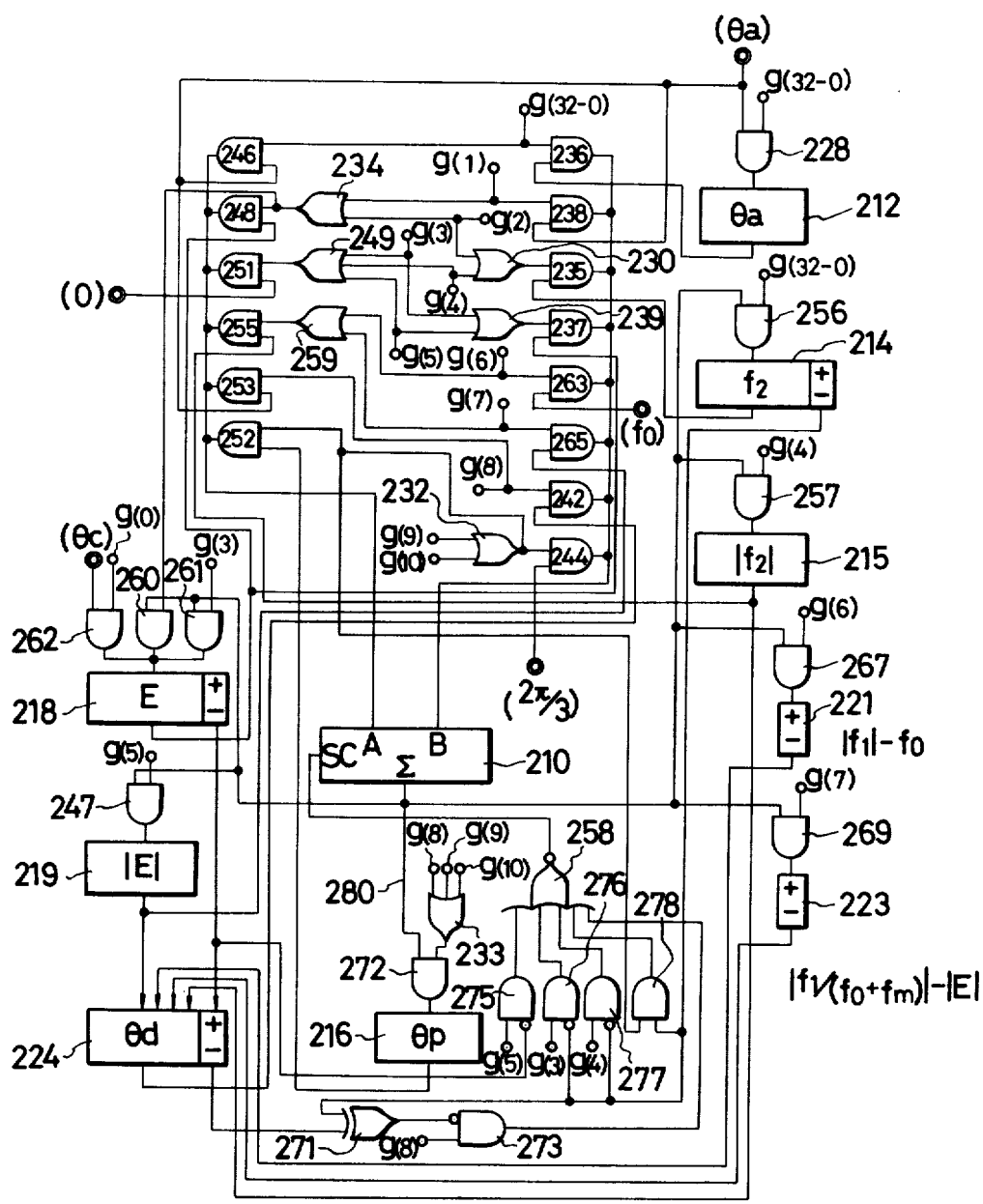
FIG. 5 is a schematic block diagram of an embodiment of the phase signal generator means of this invention designed for a synchronous motor control.

Referring now to FIG. 5, there is shown a schematic block diagram of an embodiment of the phase signal generator means 200 designed for a synchronous motor control.

Reference numeral 210 represents a digital adder. Reference characters A, B, Σ, and SC in the adder 210 respectively indicate the signal input terminal A, the signal input terminal B, the resultant signal output terminal Σ, and the add-subtract control signal terminal SC. When a logic "0" level signal is present at the terminal SC, the signal at the output terminal Σ is the sum of the two input signals, that is $\Sigma = A+B$; and when a logic "1" level signal is present at the terminal SC, the signal at the output terminal is the difference between the two input signals, that is $\Sigma = A-B$.

At the gate pulse $g(32\text{-}0)$, $\theta_a$ from the position detector means is loaded to the $\theta_a$ register 212 through a gate 228, and the signal $\theta_a$ is also present at the terminal A through a gate 246. The signal at the terminal B through a gate 236 is the contents of the $\theta_a$ register 212 which is the old data of $\theta_a$ loaded to the register in the immediately preceding cycle of the $g(32\text{-}0)$ pulse. Since the signal at the terminal SC is at logic "1" through a gate 258, the signal at the terminal Σ will be the increment of $\theta_a$ in one cycle of the gate pulse $g(32\text{-}0)$. This signal is loaded to $f_2$ register 214 through a gate 256.

When the pulse repetition frequency of the gate pulse $g(32\text{-}0)$ is 32 Hz as described for a numerical example in connection with FIG. 4, a digit representing $2\pi/32$ electrical radians at the output terminal Σ corresponds to a unit frequency at the input terminal of $f_2$ register 214. When the digits at the output terminal Σ are suitably coordinated with the digits at the input terminal of $f_2$ register 214, the contents of $f_2$ register 214 will represent the motor velocity $f_2$ in electrical revolutions per second. Thus, the operation of equation (17) is performed.

At the gate pulse $g(0)$, the reference position signal $\theta_c$ is loaded to E register 218 through a gate 262. At the gate pulse $g(1)$, the signal at the terminal A is the contents of E register 218 through a gate 248, the signal at the terminal B is $\theta_a$ through a gate 238, and the resultant signal at the terminal $\Sigma$ is $\theta_c - \theta_a$.

The digital code representing the value of $\theta_c - \theta_a$ can be used as a digital code representing the value of $G_1(\theta_c - \theta_a)$ by a proper conversion of units. For a numerical example, when the loop gain of the control system is to be so designed as to develop the change of $2\pi/2^8$ in the load angle $\theta_d$ for a change of $2\pi/2^{10}$ of the position error, the digital code for the position error will represent the value of $G_1(\theta_c - \theta_a)$ by reading the digit which represents $2\pi/2^{10}$ in the position error as a digit which represents $2\pi/2^8$ in $G_1(\theta_c - \theta_a)$.

Thus, the multiplication operation by $G_1$ can be eliminated, and the resultant signal at the terminal $\Sigma$ which is $\theta_c - \theta_a$ is loaded to E register 218 through a gate 260 as a signal representative of $G_1(\theta_c - \theta_a)$ by a proper coordination between the digits at the output terminal and the digits at the input terminal of E register 218.

Similarly, the multiplication operation by $G_2$ can also be eliminated. Therefore, in the following descriptions, explanations on the multiplications by $G_1$ and $G_2$ are omitted.

As will be understood, in this elimination of the multiplication operation, $G_1$ and $G_2$ can be adjusted by 3 decibel steps. In must be noted, however, that a multiplication by an arbitrary constant is a simple operation and a means for this multiplication can be easily included in the phase signal generator means 200 of this invention.

At the gate pulse $g(2)$, the signal at the terminal A is the contents of E register 218 through a gate 248, the signal at the terminal B is the contents of $f_2$ register 214, which is coordinated as to represent the value of $G_2f_2$ through a gate 235, and the resultant signal $E = G_1(\theta c - \theta_a) - G_2 f_2$ is loaded to E register 218 through the gate 260.

At this stage, the sign (positive or negative) of the contents of $f_2$ register 214 and that of E register 218 have been determined in accordance with the direction in which the value of $\theta_a$ increases. This direction is determined by the design of the position detector means 26, 28.

It must be reminded, however, that the sign of the control variable in equation (11-1) or (11-2) is determined in accordance with the direction of the motor rotation. Therefore, the sign of E is rectified in the following way.

At the gate pulse $g(3)$, the signal at the terminal A is 0(zero) through a gate 251, the signal at the terminal B is the contents of E register 218 through a gate 237, and the signal at the terminal SC is either at logic "1" or at logic "0" through a gate 276 in accordance with the sign digit of $f_2$ register 214. Therefore, the signal at the terminal $\Sigma$ will be $0 + E$ for a positive $f_2$ and $0 - E$ for a negative $f_2$. This signal at the terminal $\Sigma$ is loaded to E register 218 through a gate 261, and the sign for E is rectified.

At the gate pulse $g(4)$, the signal at the terminal A is 0 through the gate 251, the signal at the terminal B is the contents of $f_2$ register 214 through the gate 235, and the signal at the terminal SC is controlled by the sign digit of $f_2$ register 214 through a gate 277. The signal at the terminal $\Sigma$ which is the absolute value of $f_2$, is loaded to $|f_2|$ register 215 through a gate 257.

Reference numeral 224 represents a control variable limiting means. The details of the control variable limiting means 224 will be different in accordance with different design requirements as described in connection with Table 1. One design example of the control variable limiting means 224 will be explained in the following paragraphs.

In this example, it is assumed that the voltage amplitude $V_1$ is controlled in accordance with equation (9-1) and that the inverter 16 can not absorb the power generated by the motor 18. As is obvious from equation (5) and equation (19-b 1), the directions of the vector $\dot{V}_1$ and the vector $\dot{I}$ are the same, but the magnitude $V_1$ of the vector $\dot{V}_1$ and the magnitude $I_m \sin\theta_d$ of the vector $I$ may be either positive or negative, and the motor input power P may be either positive or negative as shown in Table 2.

(Table 2)

| Region | $\theta_d$ | $V_1$ | I | P |
|---|---|---|---|---|
| 1 | $\theta_d \geq 0$ | $V_1 \geq 0$ | $I \geq 0$ | $P \geq 0$ |
| 2 | $\theta_d < 0$ | $V_1 < 0$ | $I < 0$ | $P > 0$ |
| 3 | $\theta_d < 0$ | $V_1 > 0$ | $I < 0$ | $P < 0$ |

In Table 2, the magnitude of $\theta_d$ is assumed to be less than $\pi/2$, and therefore, values of $V_1$ and I are always non-negative for a nonnegative $\theta_d$. I is always negative for a negative $\theta_d$, but P can be positive for a negative $\theta_d$ when $f_1\cos\theta_d + f_2\sin\theta_d$ in equation (9-1) is negative and both $V_1$ and I are negative.

In order to avoid the negative power output from the inverter 16, a power absorbing means 42 is connected. It is assumed that the power absorbing means 42 can be represented, in the equivalent circuit of FIG. 2(a), by a resistance $R_m$ connected across the motor input ($R_m$ is not shown in the drawing).

The magnitude $I_t$ of the total current which will flow out from the inverter 16 when $R_m$ is connected, is $$I_t = \frac{V_1}{R_m} + I = \frac{I_m}{f_m} \{f_1\cos\theta_d + (f_o + f_m)\sin\theta_d\} \quad (22)$$

where $$f_m = \frac{2\pi L}{R_m} \quad (23)$$

For a negative $\theta_d$, $I_t$ is nonnegative in a range where $$\tan(-\theta_d) \leq \left(\frac{f_1}{f_o + f_m}\right) \quad (24)$$

Equation (24) is approximated by $$(-\theta_d) \leq \left(\frac{f_1}{f_o + f_m}\right) \quad (25)$$

when the magnitude of $\theta_d$ is comparatively small. Equation (25) means that the lowest limit value $\theta_{k2}$ of the control variable is determined as a function of the frequency $f_1$.

For example, when the control variable is limited in accordance with Table 3, the power output from the inverter 16 will not be negative.

(Table 3)

| Region | Criterion | $R_m$ | $\theta_d$ |
|---|---|---|---|
| 1 | $E \geq \pi/4$ | not connected | $\theta_d = \pi/4$ |
| 2 | $0 \leq E < \pi/4$ | " | $\theta_d = E$ |
| 3 | $f_1 \geq f_o$ and $0 > E \geq (-f_1/(f_o + f_m))$ | connected | $\theta_d = E$ |
| 4 | $f_1 \geq f_o$ and $E < (-f_1/(f_o + f_m))$ | " | $\theta_d = -f_1/(f_o + f_m)$ |
| 5 | $f_1 < f_o$ and $(-\pi/4) < E < 0$ | " | " |
| 6 | $f_1 < f_o$ and $(-\pi/4) \geq E$ | not connected | $\theta_d = -\pi/4$ |

Returning now to FIG. 5, at the gate pulse g(5), the signal at the terminal A is 0 through the gate 251, the signal at the terminal B is the contents of E register 218 through the gate 237, the signal at the terminal SC is controlled by the sign digit of E register 218 through a gate 275, and the resultant signal which is the absolute value of E is loaded to |E| register 219 through a gate 247.

At the gate pulse g(6), the signal at the terminal A is the contents of $|f_2|$ register 215 through a gate 255, the signal at the terminal B is a predetermined constant $f_o$ through a gate 263, and the sign digit of the resultant signal is loaded to a single digit register 221 through a gate 267. Since $f_1 = f_2$ for a synchronous motor, the contents of $|f_2|$ register is used as the frequency signal $f_1$, and the output of the register 221 represents the criterion for $f_1 \geq f_o$ or $f_1 < f_o$.

At the gate pulse g(7), the magnitude of $f_1/(f_o+f_m)$ is compared to $|E|$. In order to simplify this comparison, the magnitude of $f_o+f_m$ is approximated by an integral power of 2. Although this approximation is not a good approximation, still it can be used for the purpose of limiting the control variable. By this approximation, the contents of $|f_2|$ register 215 can represent the magnitude of $f_1/(f_o+f_m)$ under a proper coordination between the digits at the output terminals of $|f_2|$ register 215 and those of |E| register 219.

Thus, at the gate pulse g(7), the signal at the terminal A is the contents of $|f_2|$ register 215 through the gate 255, the signal at the terminal B is the contents of |E| register 219 through a gate 265, and the sign digit of the resultant signal which is equivalent to $f_1/(f_o+f_m)-|E|$ is loaded to a single digit register 223 through a gate 269.

Figure 6:
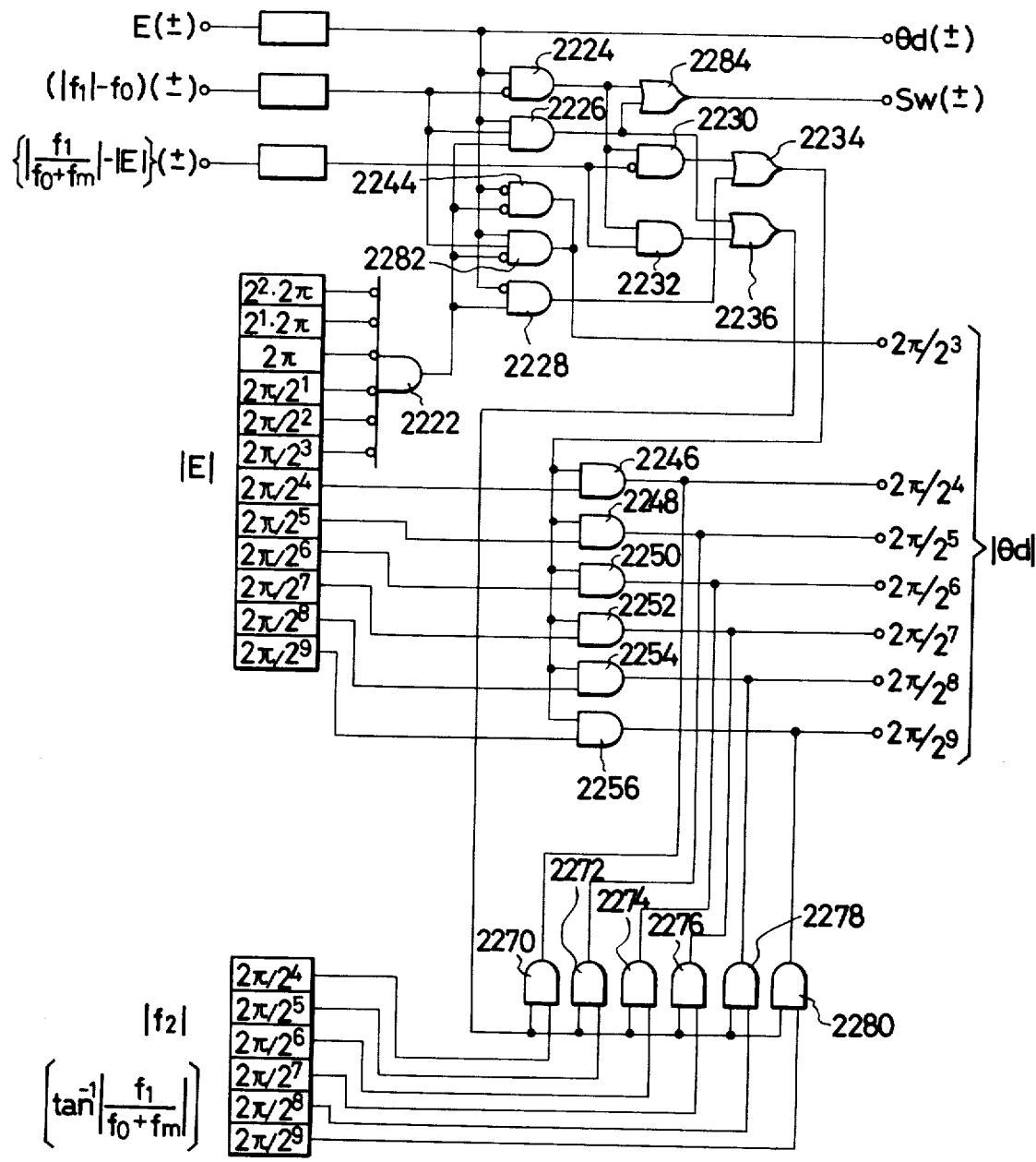
FIG. 6 is a circuit diagram of an embodiment of the control variable limiting means of this invention.

Now referring to FIG. 6, there is illustrated a circuit diagram of an embodiment of the control variable limiting means which limits the control variable in accordance with Table 3.

The input signal of this control variable limiting means 224 is the contents of |E| register 219, the contents of $|f_2|$ register 215, the sign digit of E register 218, the output of the register 221, and the output of the register 223. The output signals are the magnitude of $\theta_d$, the sign of $\theta_d$ which is denoted by $\theta_d(\pm)$, and a logic signal $S_w(\pm)$ for controlling the switching means 44.

The sign digit of E register 218 is transmitted as the sign digit $\theta_d(\pm)$. When $f_1 \geq f_o$ and $E < 0$ or when $f_1 < f_o$ and $(-\pi/4) < E < 0$, $S_w(\pm)$ is at logic "1" level through a gate 2284, and the switching means 44 is actuated by this logic signal to connect the power absorbing means 42.

A digit for the magnitude of $\theta_d$ representing $\pi/4$ is transmitted through a gate 2244 when $E \geq \pi/4$ or through a gate 2282 when $f_1 < f_o$ and $E < (-\pi/4)$. Digits for the magnitude of $\theta_d$ representing $\pi/8$ to $\pi/256$ are transmitted through gates 2246–2256 when $0 < E < \pi/4$, or when $f_1 \geq f_o$ and $0 > E \geq \{-f_1/(f_o+f_m)\}$.

The signal input to gates 2270–2280 is the contents of $|f_2|$ register 215, the digits being coordinated as to represent the angle determined by $\theta_d = f_1/(f_o+f_m)$. (Refer to equation (25)). This signal is transmitted as the magnitude of the control variable when $f_1 \geq f_o$ and $E < \{-f_1/(f_o+f_m)\}$ or when $f_1 < f_o$ and $(-\pi/4) < E < 0$.

Thus the initial value E for the control variable is limited in accordance with Table 3, and the signal of the control variable is obtained.

Again referring to FIG. 5, the instantaneous phase angle signal $\theta_p$ is synthesized in accordance with equation (19-1). It must be remembered that the sign of the load angle $\theta_d$ at the output of the control variable limiting means 224 has been determined in accordance with the direction of the motor rotation, while the sign of the load angle in equation (19-1) must be determined in accordance with the direction in which $\theta_a$ increases. Therefore, the signal on the terminal SC at the gate pulse g(8) is controlled through an Exclusive Or gate 271 whose two inputs are the sign digit of $f_2$ register 214 and the sign digit of $\theta_d(\pm)$ of the output of the control variable limiting means 224. And at the gate pulse g(8), the signal at the terminal A is $\theta_a$ through a gate 253, the signal at the terminal B is the magnitude of $\theta_d$ through a gate 242, and the resultant signal is loaded to $\theta_p$ register 216 through a gate 272.

At gate pulses g(9) and g(10), the signal at the terminal A is the contents of $\theta_p$ register 216 through a gate 252, and the signal at the terminal B is a constant $2\pi/3$ through a gate 244, the signal at the terminal SC being controlled by the sign digit of $f_2$ register 214 through a gate 278. Thus the signal at the terminal $\Sigma$ is $\theta_p$ at the gate pulse g(8), $\theta_p \pm 2\pi/3$ at the gate pulse g(9), $\nu_p \pm 4\pi/3$ at the gate pulse g(10). These signals are used to control the instantaneous phase angles of the corresponding phases of the three-phase alternating-current voltages generated by the inverter 16.

Figure 7:
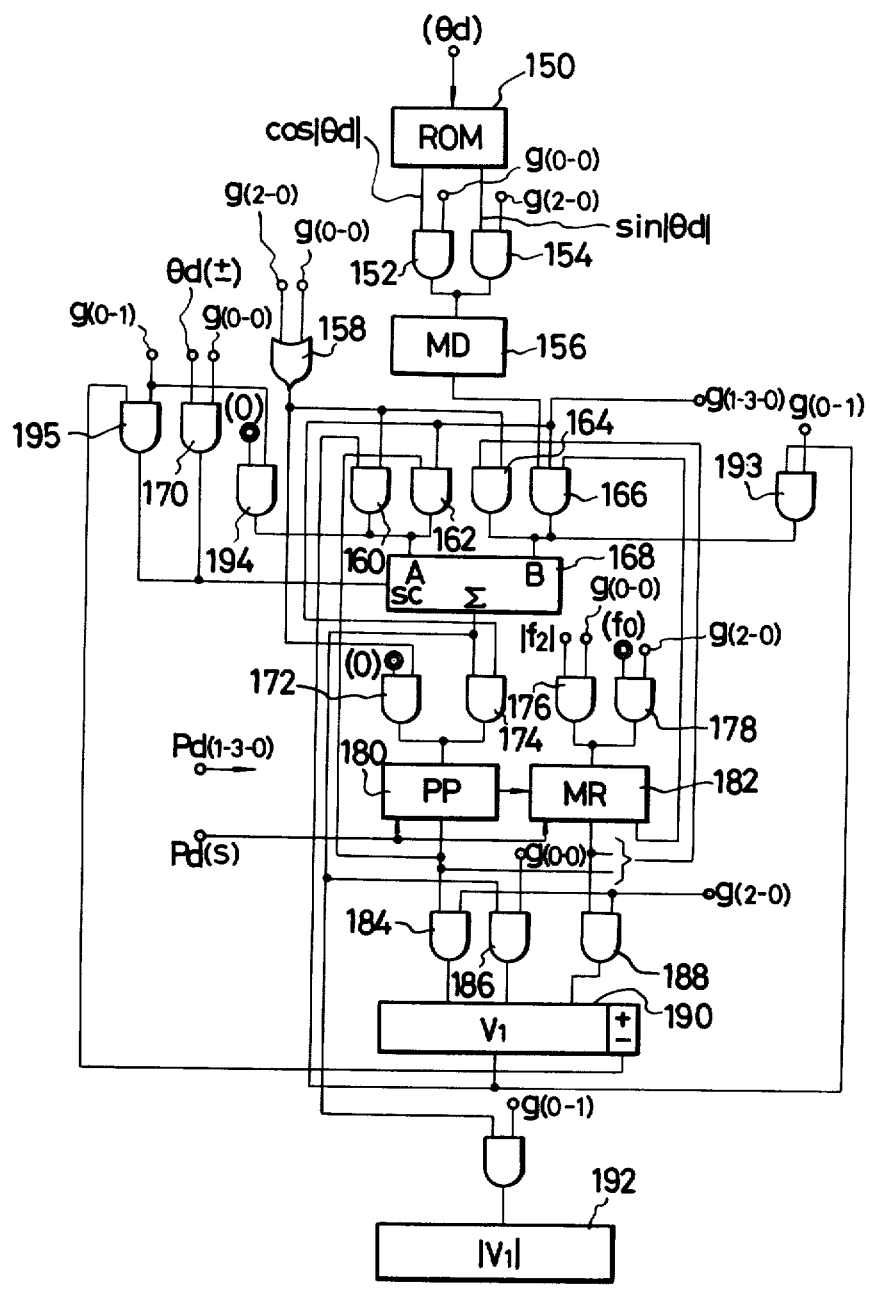
FIG. 7 is a circuit diagram of an embodiment of the voltage signal generator means of this invention.

Referring to FIG. 7, there is shown a circuit diagram of an embodiment of the voltage signal generator means 30. A read-only-memory 150 is used to obtain $\cos \theta_d$ and $\sin \theta_d$ for the input of the magnitude $|\theta_d|$ from the control variable limiting means 224. A conventional type of a digital multiplier is composed of a MD register 156, a MR register 182, a PP register 180, an adder 168, and the necessary gates as denoted by reference numerals 160, 162, . . . .

At the gate pulse g(0-0), $\cos \theta_d$ is loaded to MD register 156 through a gate 152, the contents of $|f_2|$ register 215 are loaded to MR register 182 through a gate 176, and the shift pulse $P_s(S)$ (Refer to FIG. 4) is applied to the registers 180, 182. Thus, in the first half of the g (1-3-0) gate pulse, the multiplication of $f_1 \cos \theta_d$ is performed and the product is obtained in the register 180, 182.

At the gate pulse g(2-0), the product $f_1 \cos \theta_d$ is transferred to $V_1$ register 190 through gates 184, 188, $\sin \theta_d$ is loaded to MD register 156 through a gate 154, a constant $f_o$ is loaded to MR register 182 through a gate 178, and 0 is loaded to PP register 180 through a gate 172.

In the latter half of $g(1\text{-}3\text{-}0)$ gate pulse, the multiplication of $f_o \sin \theta_d$ is performed, and at the succeeding gate pulse $g(0\text{-}0)$, the contents of $V_1$ register 190 and the contents of registers 180, 182 are algebraically added, since the signal at the terminal SC of the adder 168 is controlled by a $\theta_d(\pm)$ digit through a gate 170.

The magnitude of $V_1$ is obtained in $|V_1|$ register 192 at the gate pulse $g(0\text{-}1)$, since the signal at the terminal A of the adder 168 is 0 through a gate 194, the signal at the terminal B is the contents of $V_1$ register 190 through a gate 193, and the signal at the terminal SC is controlled by the sign digit of $V_1$ register 190 through a gate 195.

Thus the contents of $|V_1|$ register 192 during the time phase between the gate pulse $g(0\text{-}1)$ and the gate pulse $g(2\text{-}0)$ will represent the magnitude of $V_1$ when each digit of the contents is read as multiplied by the constant $2\pi L I_m$ (Refer to equation(9-1)).

The sign digit of $V_1$ register 190 is used to add $\pi$ to $\theta_p$, since $-V_1 \sin\theta_p = V_1 \sin(\theta_p + \pi)$.

Referring to FIG. 8, there is shown a circuit diagram and waveform diagrams of an embodiment of the interface means 300.

Although the instantaneous phase angle of the output of an inverter is controllable, it may sometimes be difficult for a conventional static type inverter to generate a sine waveform voltage throughout a wide frequency range, and therefore we must be contented with a rectangular or a staircase waveform voltage in some applications of the control system of this invention.

In these nonsinusoidal voltage the voltage amplitude $V_1$ of equation (9-1) or (9-2) represents the amplitude of the fundamental frequency component.

In order to control the instantaneous phase angle of a rectangular or a staircase waveform voltage which is generated by the inverter 16, the phase angle contol means 34 must generate control pulses at predetermined values of the instantaneous phase angle $\theta_p$. These predetermined phase angles will be 0 and $\pi$ for a rectangular waveform, and 0, $\pi/6$, $2\pi/6$, $4\pi/6$, $5\pi/6$, $7\pi/6$, $8\pi/6$, $10\pi/6$, and $11\pi/6$ for an example of a staircase waveform.

The interface means 300 receives the instantaneous phase angle signal $\theta_p$ from the phase signal generator means 200 and generates pulses at these predetermined values of $\theta_p$. The phase control means 34 received these pulses from the interface means 300 and controls the inverter 16.

FIG. 8 shows an embodiment in which the inverter 16 generates a rectangular waveform voltage as shown in FIG. 8(a). A signal line 280 indicates a signal output line for a digit representing $\pi$ radians from the output terminal of the adder 210. This signal is inverted for a negative $V_1$ through an Exclusive Or gate 302 whose other input is the sign digit of the $V_1$ register 190.

A gate 310 whose other input is the gate pulse $g(8)$ selects $\theta_p$, a gate 312 whose other input is the gate pulse $g(9)$ selects $\theta_p \pm 2\pi/3$, and a gate 314 whose other input is the gate pulse $g(10)$ selects $\theta_p \pm 4\pi/3$. Thus the output pulses from gate 310, 312, 314 will be as shown in FIG. 8(c), and it will be easy to control the rectangular output voltage of the inverter 16 by these output pulses.

Figure 9:
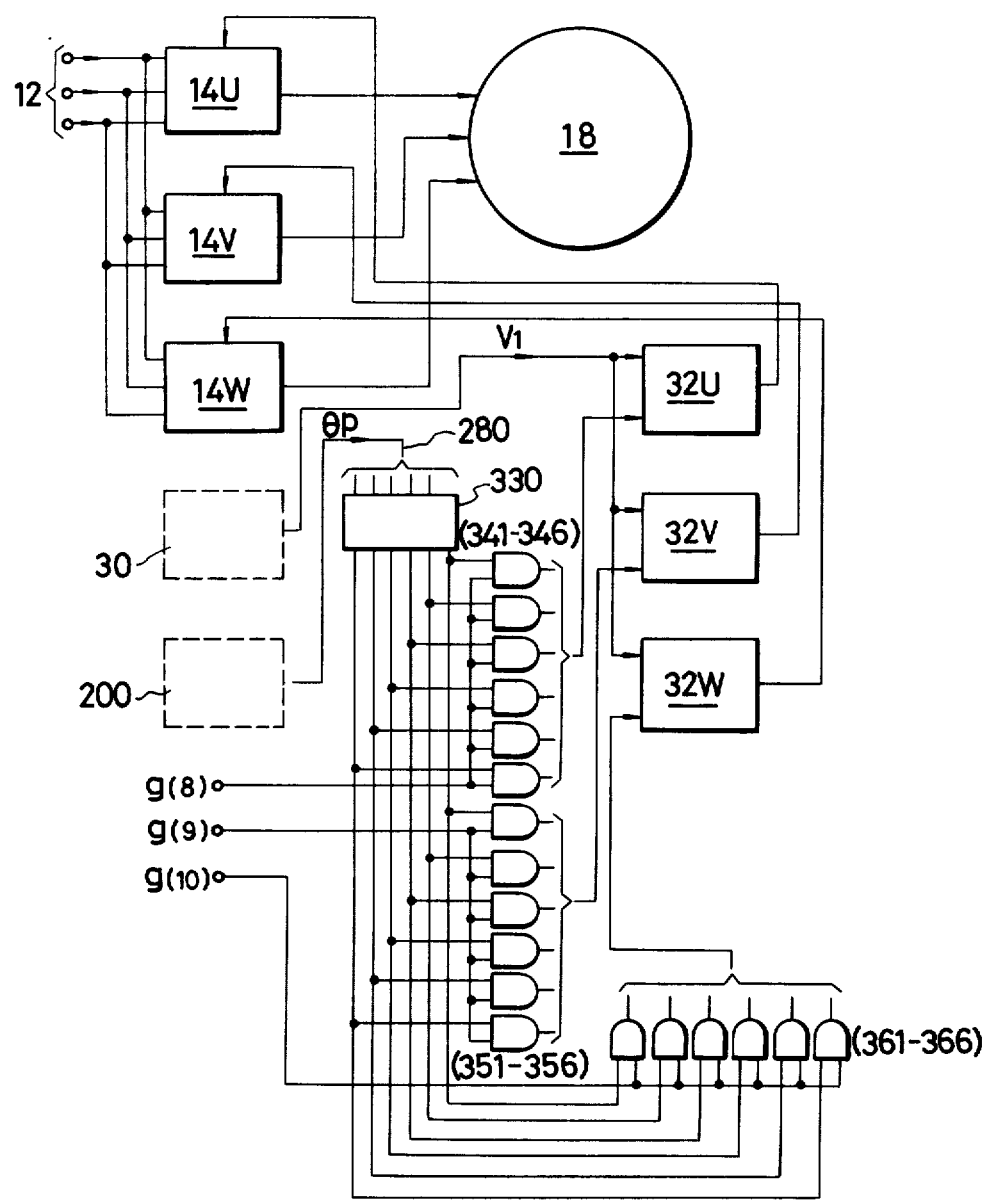
FIG. 9 is a schematic circuit diagram of an embodiment of the phase angle control means with the associated interface means.

FIG. 9 is a schematic circuit diagram of one embodiment of the phase angle control means 34 with the associated interface means 300. In this embodiment the interface means 300 comprises has a read-only-memory 330 and three groups of signal selector gates 341–346, 351–356, 361–366.

The input signal to the read-only-memory 330 is the instantaneous phase angle signal from the phase signal generator means 200, and the output is the sine function of the phase angle, that is, $\sin \theta_p$, $\sin (\theta_p \pm 2\pi/3)$, and $\sin (\theta_p \pm 4\pi/3)$. The signal $\sin \theta_p$ is selected by gates 341–346, the signal $\sin (\theta_p \pm 2\pi/3)$ is selected by gates 351–356, and the signal $\sin (\theta_p \pm 4\pi/3)$ is selected by gates 361–366.

And, in this embodiment, the instantaneous phase angle is controlled through a control of the instantaneous voltage, and therefore, the phase angle control means 34 has an instantaneous voltage signal generator and a voltage control means. In FIG. 9, the instantaneous voltage signal generator is represented as included in the voltage control means.

There are provided each one rectifier 14U, 14V, 14W and each one voltage control means 32U, 32V, 32W per phase of the three-phase alternating-current voltage, and it is assumed that each rectifier can generate a direct-current voltage of either polarity.

The voltage control means 32U receives the voltage signal $V_1$ from $|V_1|$ register 192 and the signal $\sin \theta_p$ from the gates 341–346, and generates the instantaneous voltage $V_1 \sin \theta_p$. The instantaneous value of the output voltage of the rectifier 14U is controlled with this signal $V_1 \sin \theta_p$ as the reference signal.

Similarly the instantaneous value of the output voltage of the rectifier 14V is controlled by the signal $V_1 \sin (\theta_p \pm 2\pi/3)$ which is generated in the voltage control means 32V. The instantaneous value of the output voltage of the rectifier 14W is controlled by the signal $V_1 \sin (\theta_p \pm 4\pi/3)$, which is generated in the voltage control means 32W.

Thus, a three-phase alternating-current voltage represented by $V_1 \sin \theta_p$ is supplied from the rectifiers to the motor 18. This embodiment shown in FIG. 9 is, in general, adapted to be used for a low motor velocity, since the output of a rectifier can not follow a rapid change of the instantaneous voltage signal in the higher frequency range.

When the instantaneous phase angle signal $\theta_p$ is reduced to a single digit corresponding to the magnitude of $\pi$ radians, the generated waveforms of the rectifiers will be as shown in FIG. 8(a).

Figure 10:
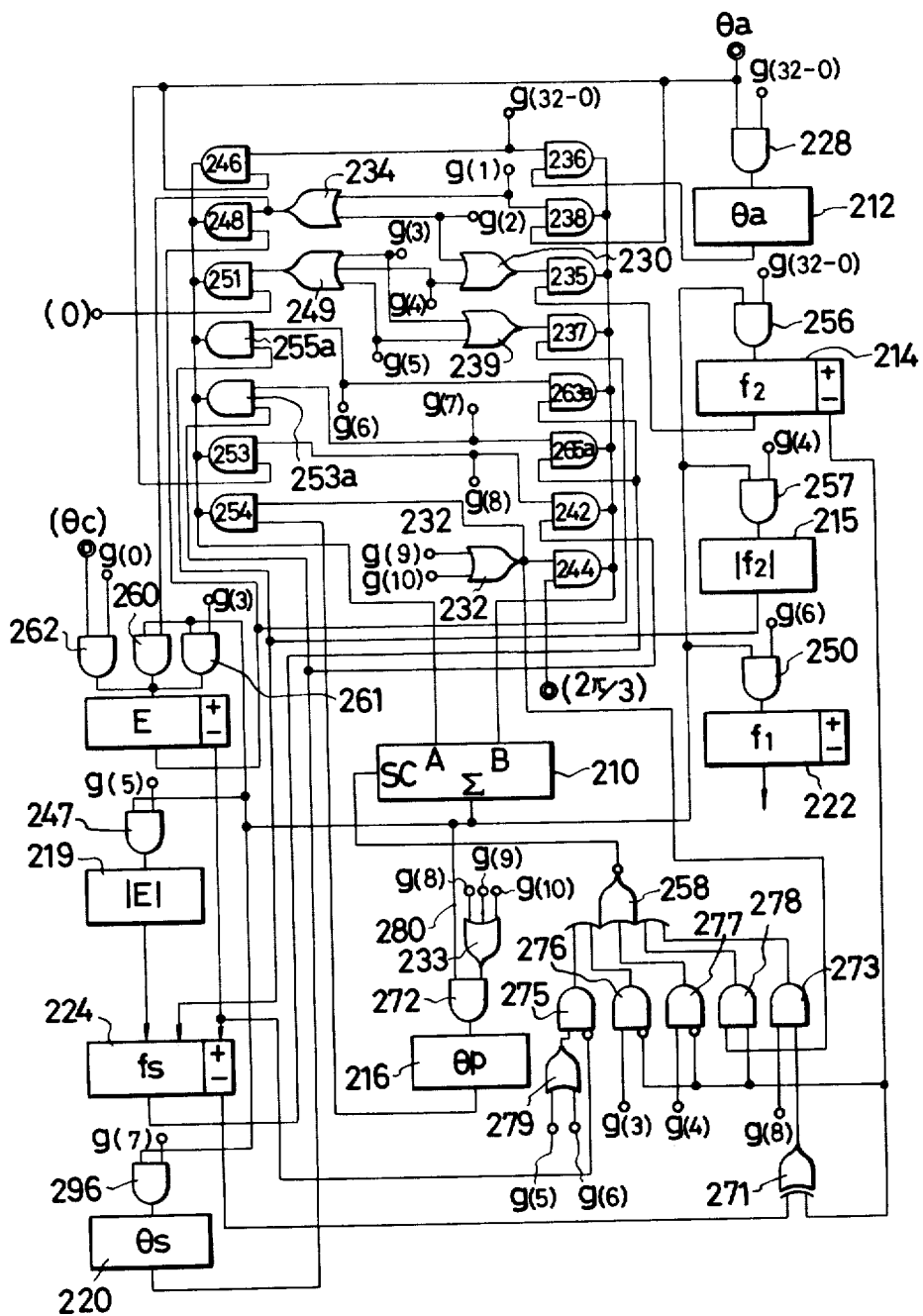
FIG. 10 is a schematic block diagram of an embodiment of the phase signal generator means of this invention designed for an induction motor control.

An embodiment of the phase signal generator means 200 designed for an induction motor control is illustrated in FIG. 10, which is similar to FIG. 5.

The initial value E for the control variable is synthesized in the same way as for a synchronous motor which is described in connection with FIG. 5.

The input signals to the control variable limiting means 224 are the contents of $|E|$ register 219, the sign digit of E register 218, and the contents of $|f_2|$ register 215.

Figure 11:
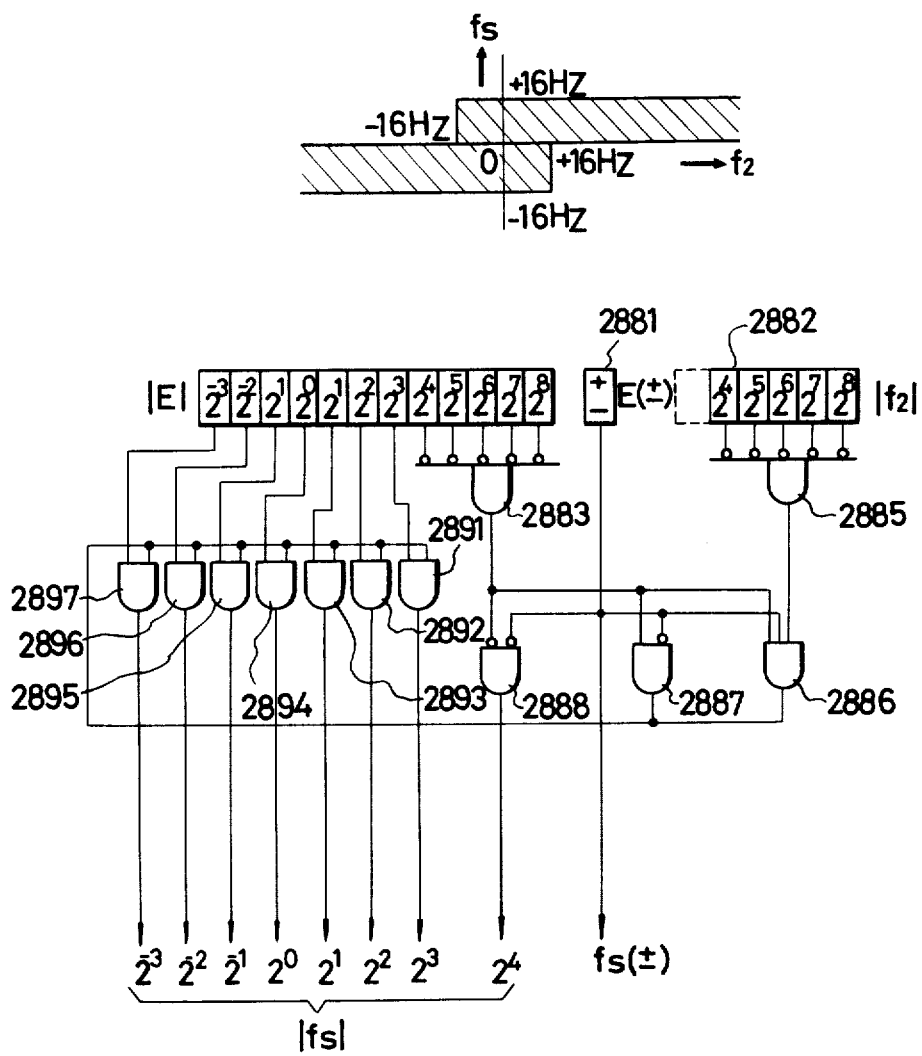
FIG. 11 shows a circuit diagram of an embodiment of the slip frequency limiting means and a graph representing the range within which the slip frequency is to be limited.

FIG. 11 shows a graph representing an example of a range within which the slip frequency is to be limited and a circuit diagram of one embodiment of the control variable limiting means 224 for limiting the slip frequency within the range as represented by the graph.

In this embodiment, it is assumed that $f_{k1}$ in Table 1 is 16 Hz, $f_{k2}$ is 0 for $f_2 \geq 16$ Hz and $-16$ Hz for $f_2 < 16$Hz, and that the power absorbing means 42 and the switching means 44 are not provided.

The sign digit of E register 218 is transmitted as the sign digit $f_s(\pm)$ of the slip frequency. The output of a gate 2883 signifies that $|E| 2 <^4$ and the output of a gate 2885 signifies that $|f_2| < 2^4$, and therefore, digits of $|E|$ from $2^3$ to $2^{-3}$ are transmitted through gates 2891-2897 when $|E| < 2^4$ and $E \geq 0$ or when $|E| < 2^4$, $E < 0$, and $|f_2| < 2^4$. The output of a gate 2888 signifies that $E < 2^4$, and this output is used as a digit representing $f_s = 2^4$.

Returning to FIG. 10, the frequency signal $f_1$ of an induction motor is synthesized in accordance with equation (20). At the gate pulse $g(6)$, the signal at the terminal A is the contents of $|f_2|$ register 215 through a gate 255a, the signal at the terminal B is the output of the control variable limiting means 224 through a gate 263a, and the signal at the terminal SC is controlled by the sign digit $f_s(\pm)$ through a gate 275. The signal at the terminal $\Sigma$ which is $f_1 = f_2 + f_s$ is loaded to $f_1$ register 222 through a gate 250.

Then $f_s$ is integrated to produce $\theta_r$. At the gate pulse $g(7)$, the signal at the terminal B through a gate 265a, which is the output of the control variable limiting means 224, is added to the signal at the terminal A through a gate 255a, which is the contents of $\theta_r$ register 220, and the resultant signal at the terminal $\Sigma$ is loaded to $\theta_r$ register 220 through a gate 296. Since the repetition rate of the gate pulse $g(7)$ is $32,768 = 2^{15}$ Hz in the numerical example as described in connection with FIG. 4, the phase shift of the frequency $f_s$ in this interval is $(2\pi)f_s 2^{-15}$ radians and the digits at the output of the control variable limiting means 224 must be coordinated to the digits at the output of $\theta_r$ register 220 in such a way as to represent this phase shift.

The synthesis of the instantaneous phase angle $\theta_p$ in accordance with equation (19-2) for an induction motor is similar to that for a synchronous motor and will need no further description. Also it will be easily understood that $\theta_p$ is obtained by integrating $f_1$ in accordance with equation (19-3).

The voltage signal generator means for an induction motor when $V_1$ is controlled in accordance with equation (9-2) is very simple and will need no further description. The descriptions on the interface means 300 and the phase angle control means 34 in connection with FIG. 8 and FIG. 9 are also applicable for an induction motor.

Throughout the foregoing description, the control system of this invention has been explained in connection with a three-phase motor. But it will not be difficult for a person skilled in the art of this technological field to apply the control system of this invention to any polyphase alternating-current motor.

One of the important advantages of the control system of this invention is that this system is of use for a precision velocity control of an alternating-current motor.

For a velocity control, the input signal to the control system of this invention is the reference velocity $f_c$. This reference velocity $f_c$ is integrated in the phase signal generator means 200 to produce the reference position $\theta_c$ as $$\theta_c = 2\pi f_c/p \qquad (26).$$

From equations (26), (17), and (21-2), it will be easily demonstrated that the velocity error will become exactly zero when $f_c$ is a constant.

The reference velocity signal $f_c$ is expressed by a digital code with reference to the frequency of the clock pulse which is used for the integration represented by equation (26), and therefore, the reference velocity signal $f_c$ can be set at any numerical value with a desired degree of precision and can be changed very easily.

For example, when the frequency of the gate pulse $g(14)$ which is $2^{15}$ Hz in the numerical example described in connection with FIG. 4, in used as the clock pulse, the value of $\theta_c$ will increase by an amount of $\Delta\theta_c = 2\pi f_c/2^{15}$ in one cycle of the clock pulse, and the accuracy of $\Delta\theta_c$ is determined by the accuracy of the clock pulse frequency.

Figure 12:
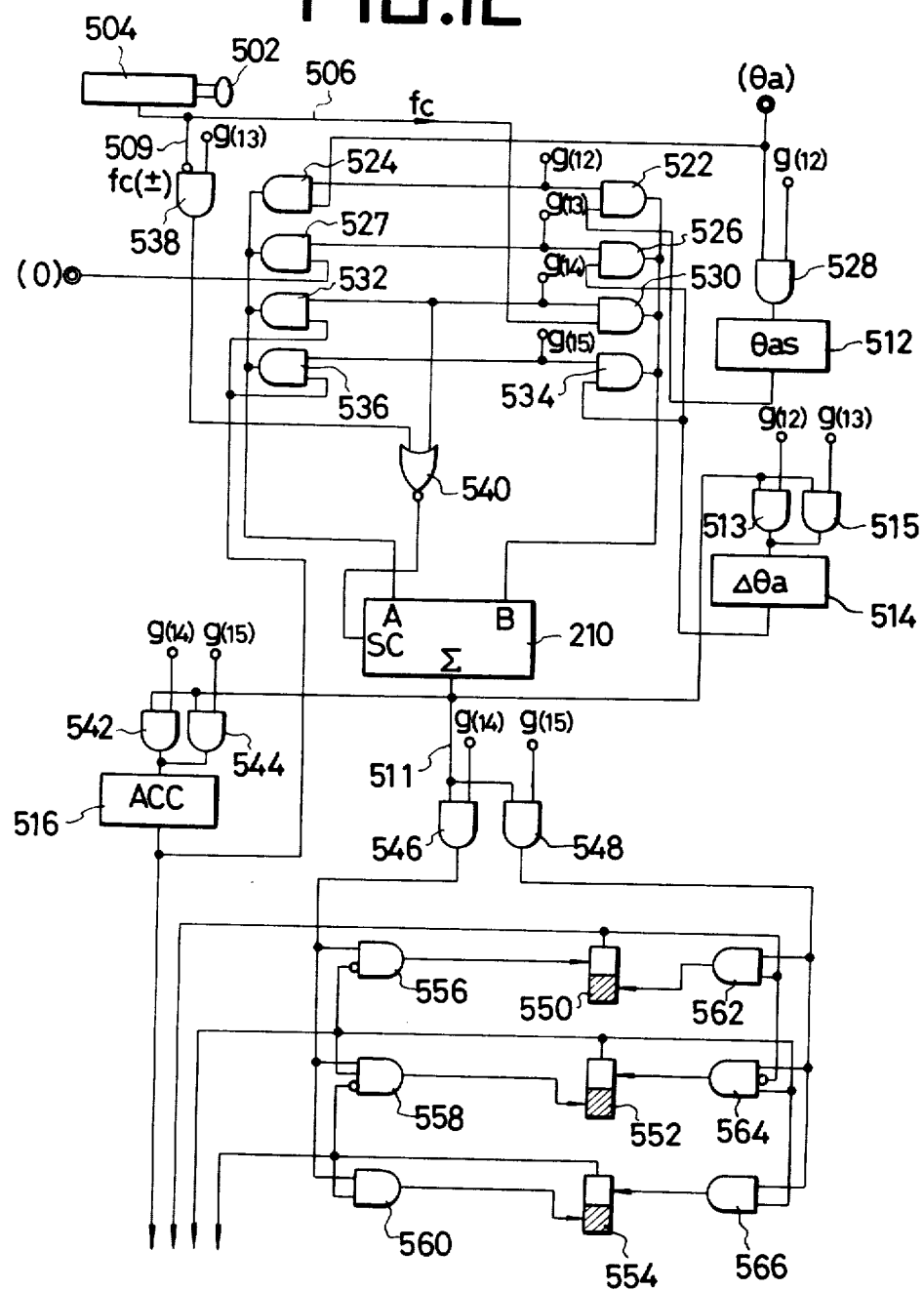
FIG. 12 is a schematic block diagram of an embodiment of a velocity error integrator means which is to be attached to the phase signal generator means of this invention.

Now referring to FIG. 12, there is illustrated a schematic block diagram of an embodiment of a velocity error integrator means which is attached to the phase signal generator means 200 when the control system of this invention is used for a velocity control of an alternating-current motor.

The adder 210 in FIG. 12 represents the same adder 210 in FIG. 5 or FIG. 10, and this adder is used for the integration at the time phases different from the time phases at which the adder is used for the data processing operations shown in FIG. 5 or FIG. 10.

At the gate pulse $g(12)$, the signal $\theta_a$ from the position detector means 26, 28 is loaded to $\theta_{as}$ register 512 through a gate 528, the signal at the terminal A of the adder 210 is $\theta_a$ through a gate 524, the signal at the terminal B is the contents of $\theta_{as}$ register 512 which is the old data of $\theta_a$ loaded to the register in the immediately preceding cycle of the $g(12)$ gate pulse, and the resultant signal which is the increment of $\theta_a$ during one cycle of the gate pulse $g(12)$ is loaded to $\Delta\theta_a$ register 514 through a gate 513.

In the embodiment of FIG. 12, the digital code representing the value of $f_c$ in relation to the repetition frequency of the gate pulse $g(14)$ is set in a data receiving means 504 by a manual switch 502. The digital code $f_c$ is assumed to be expressed by the absolute value of $f_c$ and a sign digit representing the direction of the motor rotation in relation to the direction in which $\theta_a$ increases. In other words, a negative value of $f_c$ is not represented by the conventional complement expression.

At the gate pulse $g(13)$, the polarity of $\Delta\theta_a$ is inverted when $f_c$ is negative. The signal at the terminal A is 0 through a gate 527, the signal at the terminal B is the contents of $\Delta\theta_a$ register 514 through a gate 526, the signal at the terminal SC is controlled by the sign digit of $f_c$ through a line 509 and a gate 538, and the resultant signal is loaded to $\Delta\theta_a$ register 514.

At the gate pulse $g(14)$, the signal at the terminal A is the contents of ACC register 516 through a gate 532, the signal at the terminal B is $f_c$ from a line 506 and through a gate 530. The resultant signal is accumulated in ACC register 516. The initial contents of ACC register 516 may be arbitrary since only the rate of change of the position error is a matter of concern in the velocity control system.

ACC register 516 may overflow in this addition at the gate pulse $g(14)$. An overflow of this register means a change of the position error by a constant amount has no influence on the accuracy of the controlled velocity. But the abrupt change of the contents of the register 516 which is caused by an overflow, is undesirable when the contents of the register is considered as the integration result which is used to determine the control variable.

In order to avoid the abrupt change of the integration result, three one-digit memories 550, 552, and 554 are provided, and the status of these memories are read together with the contents of ACC register 516 to indicate the integration result.

When an overflow digit appears at the terminal $\Sigma$, this overflow digit is transmitted through a line 511 and a gate 546. When the memory 552 is in a reset state, the signal from the gate 546 is transmitted to the set terminal of the memory 550 through a gate 556. When the memory 552 is in a set state and the memory 554 is in a reset state, the signal from the gate 546 is transmitted to the reset terminal of the memory 552 through a gate 558. When the memory 554 is in a set state, the signal from the gate 546 is transmitted to the reset terminal of the memory 554.

At the gate pulse $g(15)$, the signal at the terminal A is the contents of ACC register 516 through a gate 536, the signal at the terminal B is the contents of $\Delta\theta_a$ register 514 through a gate 534, and the resultant signal is loaded to ACC register 516 through a gate 544. In this subtraction at the gate pulse $g(15)$, a sign digit will appear on a line 511 and be transmitted through a gate 548 when the resultant of the subtraction is a negative value.

This sign digit is transmitted through a gate 562 to the reset terminal of the memory 550 when the memory 550 is in a set state, through a gate 564 to the set terminal of the memory 552 when the memory 550 is in a reset state and the memory 552 is in the reset state, and through a gate 566 to the set terminal of the memory 554 when the memory 552 is in a set state.

Thus the set state of the memory 550 means that no sign digit has ever appeared after the last overflow in the positive direction. The set state of the memory 552 indicates the negative sign digit for the contents of ACC register 516 (therefore, this memory 552 may be included in the digits of ACC register 516. The set state of the memory 554 means that no positive overflow has ever appeared after the last overflow in the negative direction.

Therefore when the memory 550 is in a set state, the integration result is read to be M irrespective of the contents of ACC register 516 where M is the total capacity of ACC register 516, and when the memory 554 is in a set state, the integration result is read to be -M irrespective of the contents of ACC register 516.

In this way, the integration result is expressed by the contents of ACC register 516 and the status of the three one-digit memories 550, 552, 554 and is transmitted through the terminals designated by reference numeral 568. This integration result from the terminals is loaded as the signal for $G_1(\theta_c-\theta_a)$ to E register 218 in FIG. 5 or FIG. 10.

It must be mentioned that the circuit in FIG. 12 for avoiding the abrupt change in the integration result is also useful for a velocity control system of a direct current motor in which the velocity error is time-integrated by a digital system.

In a velocity control system of a direct-current motor, the initial value E for the control variable is synthesized in the same way as described in connection with FIG. 12, this initial value E is limited in a range suitable for the control purpose to determine the control variable signal, and this control variable signal is used as the reference signal to control, for example, the magnitude of the input direct-current voltage to the motor.

Another one of the important advantages of the control system of this invention is that this system is most adapted for a programmed control system.

In some control systems, for example, in a control system of a traction motor or in a control system of an elevator motor, the reference signal (the reference position $\theta_c$ or the reference velocity $f_c$) can be easily programmed with respect to the progress of time and this programmed reference signal can be stored in a memory means. Since the input reference signal to the control system of this invention is in a form of a digital code, this form of the input signal is most suited to be stored in a memory means. Therefore the control system of this invention is most easily converted to a programmed positioning control system or a programmed velocity control system by attaching the memory means for storing the programmed reference signal and a means for reading this stored memory. The timing pulse generator means 100 of this invention can include a clock-pulse generator for reading this stored memory.

Although the foregoing descriptions of this invention are confined on the embodiments of this invention in which a constant-magnetic-flux type alternating-current motor is used, it will be easy to design a variable-magnetic-flux type motor in accordance with the requirement of the torque-velocity characteristics and to use the control system of this invention for controlling these variable-magnetic-flux type motors.

For example, when a larger torque is required at a lower speed of an induction motor, the control system of this invention can be used by modifying the voltage control law in relation to the allowable magnetic saturation for the induction motor. In some applications of the control system of this invention, the voltage amplitude $V_1$ can be a constant irrespective of the frequency $f_1$ of the power supply to the motor, and therefore, it must be noted that the voltage signal generator means 30 and the voltage control means 32 are not necessary in some applications of this invention.

Although the invention has been described in its preferred embodiments with a certain degree of particularity, it is to be understood that various changes and modifications, together with applications in diversified fields may be made in the invention without departing from the spirit and scope thereof.

What is claimed is:

1. A control system of a polyphase alternating-current motor comprising:
   a polyphase alternating-current motor;
   power supply means for generating a polyphase alternating-current voltage to be supplied to said motor, the amplitude and the instantaneous phase angle of said alternating-current voltage being controllable;
   position detector means for detecting the instantaneous electrical angular position of the rotor of said motor with respect to a stator reference;
   means for producing an initial value for the control variable to control the torque generated by said motor;
   phase signal generator means for generating an instantaneous phase angle signal from said initial value for the control variable and said detected instantaneous electrical angular position of said rotor;
   phase angle control means for controlling said instantaneous phase angle of said alternating-current voltage with said generated instantaneous phase angle signal as the reference signal;
   voltage signal generator means for generating a voltage signal in accordance with a predetermined voltage control law; and
   voltage control means for controlling said amplitude of said alternating-current voltage with said generated voltage signal as the reference signal.

2. A control system of a polyphase alternating-current motor according to claim 1 wherein said means for producing said initial value for the control variable comprises:

means for receiving a reference position signal $\theta_c$;
position detector means for detecting the controlled position $\theta_a$ of the controlled object which is connected to said motor; and
means for synthesizing said preparatory value E for the control variable in accordance with an equation $$E = G_1(\theta hd\ c - \theta_a) - G_2 p\theta_a$$

where $p$ denotes the differential operator $d/dt$ and $G_1$, $G_2$ are respectively predetermined amplification constants, the value for $G_2$ including zero.

3. A control system of a polyphase alternating-current motor according to claim 2 wherein said means for receiving a reference position signal $\theta_c$ comprises:
data memory means for storing the data of said reference position signal $\theta_c$ as a function of time; and
data memory reading means including a clock generator for reading-out said stored data of said reference position signal.

4. A control system of a polyphase alternating-current motor according to claim 2 wherein said means for receiving a reference position signal $\theta_c$ comprises:
means for receiving a reference velocity signal $f_c$; and
integrator means for integrating said reference velocity signal $f_c$ to produce said reference position signal $\theta_c$.

5. A control system of a polyphase alternating-current motor according to claim 4 wherein said means for receiving a reference velocity signal $f_c$ comprises:
data memory means for storing the data of said reference velocity signal $f_c$ as a function of time; and
data memory reading means including a clock generator for reading-out said stored data of said reference velocity signal.

6. A control system of a polyphase alternating-current motor according to claim 2 wherein the signal $\theta_c - \theta_a$ is represented by a digital code, each digit of said digital code representative of said signal of $\theta_c - \theta_a$ is considered as a digit representing the value which is equal to the original value multiplied by $G_1$, and said digital code representative of said signal of $\theta_c - \theta_a$ is used as the digital code representing the signal of $G_1(\theta_c - \theta_a)$.

7. A control system of a polyphase alternating-current motor according to claim 2 wherein the signal of $p\theta_a$ is represented by a digital code, each digit of said digital code representative of said signal of $p\theta_a$ is considered as a digit representing the value which is equal to the original value multiplied by $G_2$, and said digital code representative of said signal of $p\theta_a$ is used as the digital code representing the signal of $G_2 p\theta_a$.

8. A control system of a polyphase alternating-current motor according to claim 1 wherein said motor is a synchronous motor and said phase signal generator means comprises:
control variable limiting means for determining a load angle signal by limiting said initial value for the control variable in accordance with a predetermined control variable limiting law; and
synthesizer means for generating said instantaneous phase angle signal by algebraically adding said determined load angle to said detected instantaneous electrical angular position of said rotor.

9. A control system of a polyphase alternating-current motor according to claim 1 wherein said motor is an induction motor and said phase signal generator means comprises:
control variable limiting means for determining a slip frequency signal by limiting said initial value for the control variable in accordance with a predetermined control variable limiting law;
integrator means for generating a slip phase angle signal by integrating said determined slip frequency signal; and
synthesizer means for generating said instantaneous phase angle signal by algebraically adding said generated slip phase angle signal to said detected instantaneous electrical angular position of said rotor.

10. A control system of a polyphase alternating-current motor according to claim 1 wherein said motor is an induction motor and said phase signal generator means comprises:
control variable limiting means for determining a slip frequency signal by limiting said initial value for the control variable in accordance with a predetermined control variable limiting law;
arithmetic circuit means for producing a velocity signal representative of the number of the electrical angular revolutions per second of said rotor from said detected instantaneous electrical angular position of said rotor;
synthesizer means for generating a frequency signal by algebraically adding said determined slip frequency signal to said velocity signal; and
integrator means for generating said instantaneous phase angle signal by integrating said generated frequency signal.

11. A control system of a polyphase alternating-current motor according to claim 8 wherein said voltage signal generator means comprises:
arithmetic circuit means for producing a frequency signal representative of the number of the electrical angular revolutions per second of said rotor from said detected instantaneous electrical angular position of said rotor; and
means for determining said voltage signal as a predetermined function of said frequency signal.

12. A control system of a polyphase alternating-current motor according to claim 9 wherein said voltage signal generator means comprises:
arithmetic circuit means for producing a velocity signal representative of the number of the electrical angular revolutions per second of said rotor from said detected instantaneous electrical angular position of said rotor;
synthesizer means for generating a frequency signal by algebraically adding said determined slip frequency signal to said velocity signal; and
means for determining said voltage signal as a predetermined function of said frequency signal.

13. A control system of a polyphase alternating-current motor according to claim 10 wherein said voltage signal generator means comprises means for determining said voltage signal as a predetermined function of said frequency signal.

14. A control system of a polyphase alternating-current motor according to claim 8 wherein said voltage signal generator means comprises:
arithmetic circuit means for producing a frequency signal representative of the number of the electrical angular revolutions per second of said rotor from said detected instantaneous electrical angular position of said rotor;
function signal generating means for generating a signal representative of cos $\theta_d$ and a signal representative of sin $\theta_d$ from said determined load angle signal $\theta_d$;

multiplier and adder means for producing a resultant signal which is the sum of two products, the first of said two products being the product of said frequency signal multiplied by said signal representative of cos $\theta_d$, and the second of said two products being the product of a predetermined constant multiplied by said signal representative of sin $\theta_d$, said predetermined constant being determined by the machine constants of said motor; and means for determining said voltage signal in direct proportion to said resultant signal, the ratio between said voltage signal and said resultant signal being determined by the strength of the magnetic field of said rotor.

15. A control system of a polyphase alternating-current motor according to claim 8 wherein said control variable limiting means comprises:

comparator means for generating a logic signal which indicates that the magnitude of said initial value for the control variable is less than a predetermined constant load angle, said predetermined constant load angle being determined from considerations on the performance characteristics of said motor and said power supply means;

gate means for delivering a load angle signal representative of said predetermined constant load angle when said logic signal from said comparator means is indicating that said magnitude of said initial value for the control variable is not less than said predetermined constant load angle; and gate means for delivering said initial value for the control variable as a load angle signal when said logic signal from said comparator means is indicating that said magnitude of said initial value for the control variable is less than said predetermined constant load angle.

16. A control system of a polyphase alternating-current motor according to claim 15 wherein said control variable limiting means further comprises means for further limiting the magnitude of said load angle in the direction opposite to the direction of the motor rotation as a predetermined function of the motor velocity, said predetermined function being determined from considerations on the performance characteristics of said power supply means.

17. A control system of a polyphase alternating-current motor according to claim 9 wherein said control variable limiting means comprises:

comparator means for generating a logic signal which indicates that the magnitude of said initial value for the control variable is less than a predetermined constant slip frequency, said predetermined constant slip frequency being determined from considerations on the performance characteristics of said motor and said power supply means;

gate means for delivering a slip frequency signal representative of said predetermined constant slip frequency when said logic signal from said comparator means is indicating that said magnitude of said initial value for the control variable is not less than said predetermined constant slip frequency; and gate means for delivering said initial value for the control variable as a slip frequency signal when said logic signal from said comparator means is indicating that said magnitude of said initial value for the control variable is less than said predetermined constant slip frequency.

18. A control system of a polyphase alternating-current motor according to claim 17 wherein said control variable limiting means further comprises means for further limiting the magnitude of said slip frequency in the direction opposite to the direction of the motor rotation as a predetermined function of the motor velocity, said predetermined function being determined from considerations on the performance characteristics of said power supply means.

19. A control system of a polyphase alternating-current motor according to claim 10 wherein said control variable limiting means comprises:

comparator means for generating a logic signal which indicates that the magnitude of said initial value for the control variable is less than a predetermined constant slip frequency, said predetermined constant slip frequency being determined from considerations on the performance characteristics of said motor and said power supply means;

gate means for delivering a slip frequency signal representative of said predetermined constant slip frequency when said logic signal from said comparator means is indicating that said magnitude of said initial value for the control variable is not less than said predetermined constant slip frequency; and gate means for delivering said initial value for the control variable as a slip frequency signal when said logic signal from said comparator means is indicating that said magnitude of said initial value for the control variable is less than said predetermined constant slip frequency.

20. A control system of a polyphase alternating-current motor according to claim 19 wherein said control variable limiting means further comprises means for further limiting the magnitude of said slip frequency in the direction opposite to the direction of the motor rotation as a predetermined function of the motor velocity, said predetermined function being determined from considerations on the performance characteristics of said power supply means.

21. A control system of a polyphase alternating-current motor according to claim 1, in which said phase angle control means includes pulse generator means for generating a pulse at each of predetermined values of said instantaneous phase angle signal, said predetermined values of said instantaneous phase angle signal being determined by the rectangular or the trapezoidal waveform voltage to be generated by said power supply means and said generated pulses controlling said power supply means.

22. A control system of a polyphase alternating-current motor according to claim 1, in which said phase angle control means and said voltage control means comprises:

an instantaneous voltage signal generator means for generating an instantaneous voltage amplitude signal from said instantaneous phase angle signal and said voltage signal;

an instantaneous voltage amplitude control means for controlling the instantaneous amplitude of the voltage of said power supply means with said instantaneous voltage amplitude signal as the reference signal.

23. A velocity control system of an electric motor in which the velocity error between a reference velocity and the controlled velocity of said motor is integrated by digital adder means to produce the position error in digital register means, the improvement comprising:

a positive overflow memory, a sign digit memory, and a negative overflow memory;

a first gate for transmitting the overflow digit signal at the resultant output terminal of said adder means to the set terminal of said positive overflow memory when said sign digit memory is in a reset state;

a second gate for transmitting said overflow digit signal to the reset terminal of said sign digit memory when said sign digit memory is in a set state and said negative overflow memory is in a reset state;

a third gate for transmitting said overflow digit signal to the reset terminal of said negative overflow memory when said negative overflow memory is in a set state;

a fourth gate for transmitting the sign digit signal at the resultant output terminal of said adder means to the reset terminal of said positive overflow memory when said positive overflow memory is in a set state;

a fifth gate for transmitting said sign digit signal to the set terminal of said sign digit memory when both said sign digit memory and said negative overflow memory are in reset states;

a sixth gate for transmitting said sign digit signal to the set terminal of said negative overflow memory when said sign digit memory is in a set state;

when both said positive overflow memory and said negative overflow memory are in reset states, said position error being represented by the contents of said register means and the state of said sign digit memory;

when said positive overflow memory is in a set state, said position error being assumed to be M irrespective of the contents of said register means where $M-1$ is the maximum capacity of said register means; and when said negative overflow memory is in a set state, said position error being assumed to be $-M$ irrespective of the contents of said register means.

* * * * *